United States Patent
Gardner

(10) Patent No.: US 12,399,771 B2
(45) Date of Patent: Aug. 26, 2025

(54) POWER SUPPLY WITH SYSTEM MONITORING

(71) Applicant: Analog Devices, Inc., Wilmington, MA (US)

(72) Inventor: Douglas J. Gardner, Palm Harbor, FL (US)

(73) Assignee: Analog Devices, Inc., Wilmington, MA (US)

( * ) Notice: Subject to any disclaimer, the term of this patent is extended or adjusted under 35 U.S.C. 154(b) by 62 days.

(21) Appl. No.: 18/465,771

(22) Filed: Sep. 12, 2023

(65) Prior Publication Data

US 2025/0086049 A1   Mar. 13, 2025

(51) Int. Cl.
| | |
|---|---|
| *G06F 11/00* | (2006.01) |
| *G06F 1/28* | (2006.01) |
| *G06F 11/07* | (2006.01) |
| *G06N 20/00* | (2019.01) |

(52) U.S. Cl.
CPC ............ *G06F 11/0793* (2013.01); *G06F 1/28* (2013.01); *G06N 20/00* (2019.01)

(58) Field of Classification Search
CPC ...... G06F 1/28; G06F 11/0793; G06F 11/079; G06N 20/00
See application file for complete search history.

(56) References Cited

U.S. PATENT DOCUMENTS

| | | | |
|---|---|---|---|
| 10,871,818 B1* | 12/2020 | De La Cropte De Chanterac ...... G06F 1/325 |
| 11,316,851 B2* | 4/2022 | Sohail ..................... G06N 20/00 |
| 11,372,465 B1* | 6/2022 | Srinivasan ................ G06F 1/30 |
| 11,681,831 B2* | 6/2023 | Ngo .......................... G06F 1/28 726/22 |
| 2017/0010652 A1* | 1/2017 | Huang ................... G06F 1/3234 |
| 2017/0185495 A1* | 6/2017 | Jau ............................ G06F 1/28 |
| 2018/0330091 A1* | 11/2018 | Prowell ................. G06F 21/552 |
| 2020/0033923 A1* | 1/2020 | Koeninger .......... H04L 43/0811 |
| 2020/0133752 A1* | 4/2020 | Ganesan ................... G06F 1/28 |
| 2020/0327255 A1* | 10/2020 | Ngo ...................... G06F 21/577 |
| 2020/0403991 A1* | 12/2020 | Sohail ................. H04L 63/1433 |
| 2025/0086049 A1* | 3/2025 | Gardner .............. G06F 11/0793 |

* cited by examiner

*Primary Examiner* — Jonathan D Gibson
(74) *Attorney, Agent, or Firm* — Schwegman Lundberg & Woessner, P.A.

(57) ABSTRACT

Various examples described herein are directed to power supplies and methods of operating power supplies. A power supply may comprise a regulator circuit configured to generate an output electrical signal and a sensor configured to generate a sensor signal describing the output electrical signal. The power supply may also comprise at least one processor that is programmed to determine that the sensor signal fails to match expected system profile data describing an operation of at least one component electrically coupled to the power supply. Responsive to determining that the sensor signal fails to match the expected system profile data, the at the least one processor may be programmed to execute a remedial action.

20 Claims, 15 Drawing Sheets

POWER SUPPLY WITH SYSTEM MONITORING

BACKGROUND

A power supply can generate one or more output electrical signals that can be utilized by various components of a powered system. For example, a power supply may provide power to for various sensors, motors, actuators, and/or other components. The output electrical signal may be an alternating current (AC) signal or a direct current (DC) signal.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION

Figure 1:
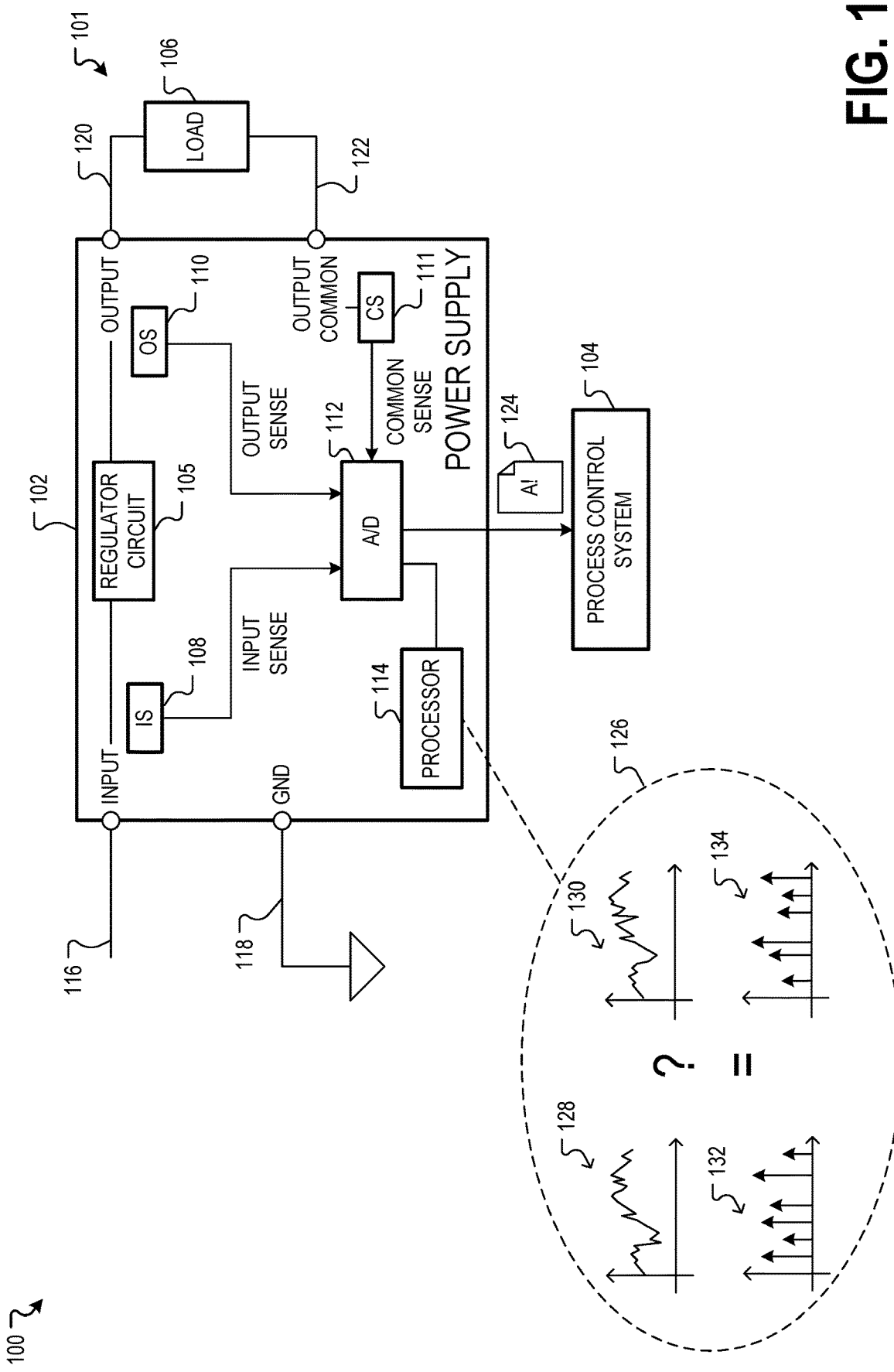
FIG. 1 is a diagram showing one example of an environment including a powered system and a process control system.

Systems utilizing a power supply, referred to herein as powered systems, may be vulnerable to various attacks. Consider an example powered system comprising a number of security cameras and a power supply. The security cameras may be programmed to execute a control loop that involves capturing images of a secure location or set of secured locations. According to an example attack, an attacker may modify software for controlling the security cameras. The modified software may, for example, falsify image data captured by the various security cameras, modify the field-of-view of the cameras, and/or otherwise change the output of security cameras. This may compromise the effectiveness with which the security cameras can monitor the secure location or locations, allowing the security system to be defeated.

Consider another example powered system comprising a number of motors, sensors, actuators, and/or other components in an industrial system. The powered system may be arranged to perform all or part of an industrial process such as, for example, a manufacturing process, a chemical process, and/or the like. An attacker may modify the system, for example, by disabling or modifying one or more of the components and/or by modifying software operating the components so as to compromise the effectiveness of the industrial system. For example, the attacker may modify software accessing the sensors so as to provide false data to a process control system monitoring the components. In other examples, the attacker may modify the software so as to sabotage the industrial process being performed by the powered system.

Security for powered systems can be provided, for example, by securing any networks that might provide a malicious actor with access to the powered system and its components. In other examples, security for a powered system may include software-implemented security tools at the components themselves and/or at a process control system or other computing device associated with the powered system.

Security techniques that involve securing networks and/or powered system components may be effective, but also suffer from certain disadvantages. For example, an attack against a powered system may involve modifying software executing at one or more of the system components. When security measures are implemented in software, those security measures themselves may be vulnerable to an attack that involves modifying the system software.

Various examples address these and other challenges with a power supply that is programmed to monitor a powered system and detect anomalies in the powered system that may indicate a security breach, malfunction, or other abnormality in the operation of the powered system. For example, a power supply may comprise a regulator circuit that is configured to generate an output electrical signal, a sensor configured to generate at least one sensor signal describing the output electrical signal, and at least one processor. The processor may be programmed to compare the at least one sensor signal to expected system profile data. The expected system profile data describes the operation of the at least one component electrically coupled to the power supply such as, for example, a security camera, motor, sensor, actuator, and/or other component of a powered system. If the at least one sensor signal fails to match the expected system profile data, the power supply may execute a remedial action. Example remedial actions may include sending an alert message describing a deviation of the sensor signal from the expected system profile data, initiating a shutdown of the power supply, initiating a shutdown the powered system, and/or the like.

The expected system profile data may describe the operation of the powered system according to its intended control routine. For example, the expected system profile data for a powered system may describe changes to the output electrical signal of the power supply over time as the powered system operates. For example, as the powered system operates over time, the power consumed by the various components changes, causing a corresponding change in the output electrical signal provided by power supply. For example, consider a powered system comprising a motor. If the motor is running, it may consume power and, thereby, cause an increase in voltage, current, power, or other measurable of the output electrical signal of the power supply. If the motor is not running, it may consume less power or no power, resulting in a corresponding decrease in the measurable of the output electrical signal.

A powered system may operate according to a repeatable control routine. The expected system profile data may describe changes to the output electrical signal of the power supply over time as the repeated control routine executes. Deviations between the sensor signal(s) and the expected system profile data may occur, for example, when the current operation of the powered system does not match the expected operation of the control routine, as indicated by the expected system profile data.

Consider the example powered system introduced above that comprises a number of security cameras. The system may execute a control routine that includes capturing a predetermined set and/or sequence of images using the various security cameras. This may result in expected system profile data indicating increases to the output electrical signal of the power supply at the points in time when the various security cameras are capturing respective images. If a malicious actor modifies the powered system, for example, to disable one or more of the security cameras, falsify images captured by one or more of security cameras, change the order of image capture, or otherwise modify the powered system, the power supply may detect the modification by detecting a deviation between the sensor signal and the expected system profile data.

Also, consider again the example powered system comprising motors, sensors, actuators, and/or other components in an industrial system. As the powered system performs an industrial process, the various components may be operated according to a control routine that implements a repeating pattern. As various components are activated or deactivated, they may draw more or less power from the power supply. The expected system profile data for the powered system may indicate changes to the output electrical signal of the power supply during the industrial process. If a malicious actor modifies the powered system to disable, sabotage, or otherwise modify the industrial process, the power supply may detect the modification by detecting a deviation between the sensor signal and the expected system profile data.

In various examples, the systems and methods described herein may also be used for detecting malfunctions in a powered system. For example, just as an attack from a malicious actor may cause the one or more sensor signals to deviate from the expected system profile data, a malfunction in the powered system may also cause such a deviation. Various examples described herein may detect deviations from the expected system profile of a powered system that are due to malfunctions, only where, and/or other reasons.

FIG. 1 is a diagram showing one example of an environment 100 including a powered system 101 and a process control system 104. The powered system 101 comprises a power supply 102 and a load 106. The load 106 may comprise a set of one or more components of the powered system 101. The one or more components may include various sensors, motors, pumps, actuators, and/or the like. Additional details and examples describing the load 106 are provided herein with respect to FIG. 2.

The power supply 102 receives an input electrical signal 116 relative to a ground 118. The input electrical signal 116 may be described by a voltage, a current, a power, and/or other suitable metric or metrics. The input electrical signal 116 may be an AC or DC signal. A regulator circuit 105 receives the input electrical signal 116 and generates an output electrical signal 120 that may be measured relative to an output common 122. The output electrical signal 120 is provided to the load 106.

The input electrical signal 116 and output electrical signal 120 may be of different types such as different voltage levels, different current levels, different polarities, and/or the like. In some examples, the regulator circuit 105 is an AC/AC regulator that receives an AC input electrical signal 116 and generates an AC output electrical signal 120, for example, at a different voltage level than the input electrical signal 116, a different current level than the input electrical signal 116, a different frequency than the input electrical signal 116, a different polarity than the input electrical signal 116, and/or the like. In some examples, the regulator circuit 105 is a DC/DC regulator that receives an DC input electrical signal 116 and generates a DC electrical output signal 120, for example, at a different voltage level than the input electrical signal 116, a different current level than the input electrical signal 116, and/or the like. In some examples, the regulator circuit 105 is an AC/DC regulator that receives an AC input electrical signal 116 and generates a DC output electrical signal 120. Example types of AC/DC regulators include linear regulators, switch-mode regulators, capacitive regulators, and/or the like.

The power supply 102 also includes sensors 108, 110, 111 and at least one processor 114. An input sensor 108 may sense the input electrical signal 116. For example, the input sensor 108 may sense a voltage level of the input electrical signal 116, a current level of the input electrical signal 116, or other suitable property of the input electrical signal 116. An output sensor 110 may sense the output electrical signal 120. The output sensor 110 may sense a voltage level of the output electrical signal 120, a current level of the output electrical signal 120, or other suitable property of the output electrical signal 120. An output common sensor 111 may sense a return signal from the load 106 received at the output common 122. For example, the output electrical signal may be a difference between the signal generated by the output sensor 110 and the signal generated by the output common sensor 111.

The input sensor 108, output sensor 110, and common output sensor 111 may be of any suitable type. In the example of FIG. 1, the input sensor 108, output sensor 110, and common output sensor 111 are analog sensors generating analog sensor signals. The analog sensor signals are provided to an analog-to-digital (A/D) converter 112 that converts the respective sensor signals to digital signals that are provided to the processor 114. In some examples, one or more of the sensors 108, 110, 111 are digital sensors that a provide a digital signal directly to the processor 114.

The processor 114 may be programmed to manage the operation of the power supply 102. For example, the processor 114 may be configured to provide a control signal to the regulator circuit 105 to cause the regulator circuit 105 to modify the output electrical signal 120. In this way, the power supply 102 may maintain a desirable output electrical signal 120 despite, for example, changes in behavior and/or properties of the load 106, changes in the input electrical signal 116, and/or the like. In some examples, components of the power supply 102 may be fully or partially contained within an enclosure. The enclosure may be made from any suitable material such as, for example, a metal, a plastic, a composite, and/or the like.

In the example of FIG. 1, the processor 114 is also programmed to perform monitoring of the power supply system, including the load 106. The processor 114 may receive and/or generate expected system profile data describing the operation of the load 106. The expected system profile data may describe an expected output electrical signal 120 of the power supply 102 over time, such as over one or more control routine cycles of the powered system 101. As described herein, changes to the output electrical signal 120 of the power supply over time may be caused by changes in the operation of components making up the load 106. The expected system profile data may describe an expected behavior of the load 106, as expressed by the output electrical signal 120. The expected system profile data, in some examples, is determined by the processor 114 based on observations of the behavior of the load 106. In other examples, the expected system profile data is received by the processor 114 from another component such as, for example, the process control system 104.

Expected system profile data may be expressed in any suitable manner. In some examples, the expected system profile data comprises power profile data of the load 106 describing one or more metrics of the output electrical signal 120 over one or more time periods. For example, the expected system profile data may describe a current of the output electrical signal 120 over time, a voltage of the output electrical signal 120 over time, a power provided by the output electrical signal 120 over time, and/or the like. In some examples, the expected system profile data comprises a spectrum or power signature of the load 106. The spectrum of the load 106 indicates a frequency content of the output electrical signal 120.

The expected system profile data may describe power profile data of the output electrical signal 120, spectrum data of the output electrical signal 120, or both over one or more time periods. The time period may correspond to one or more control routine cycles of the components of the load 106. Consider again the powered system example including security cameras. One control routine cycle of the powered system may include, for example, capturing an image from each of the security cameras. Also consider the powered system example including components for executing an industrial process. One control routine cycle of the powered system may include, for example, one instance or unit of the industrial process.

The processor 114 may receive sensor signals from one or more of the sensors 108, 110, 111 and generate observed system profile data. The observed system profile data may describe one or more properties of the output electrical signal 120 provided to the load 106 as sensed by one or more of the sensors 108, 110, 111 in a present time period. In some examples, the processor 114 may express the observed system profile data as a power profile of the output electrical signal 120 over a measured time period, a spectrum of the output electrical signal 120 over a measured time period, and/or both. For example, the processor 114 may receive data from one or more of the sensors 108, 110, 111 over a time period corresponding to one or more control routine cycles of the powered system 101. The processor 114 may derive power profile data describing the powered system 101 over the time period and/or a spectrum of the output electrical signal 120 over the time period. In some examples, the processor 114 may derive an observed spectrum by applying a transform to the one or more sensor signals such as, for example, a Fast Fourier Transform (FFT), a Short Time Fourier Transform (STFT), or other suitable algorithm.

An example representation of an STFT transform that may be used to derive an observed spectrum from one or more sensor signals is provided by Equation [1] below:

$$STFT = \{x[n]\}(m, w) = \sum_{n=-\infty}^{+\infty} x[n]w[n-m]e^{j\omega n} \quad [1]$$

In Equation [1], the STFT transform is taken over a time window indicated by window function w[n−m]. Accordingly, the expected spectrum and observed spectrum may be measured over a series of multiple time windows, which may provide a comparison of frequency content and time.

The processor 114 may compare the sensor signals, as represented by the observed system profile data, to the expected system profile data. This may include time-aligning the observed system profile data and the expected system profile data. FIG. 1 includes a breakout window 126 depicting plots 128, 130, 132, 134 illustrating an example comparison between observed system profile data and expected system profile data. The plots 128, 130 describe power profile data, with the plot 128 describing an observed metric of the output electrical signal 120 over time and the plot 130 representing expected values for the metric of the output electrical signal 120 over time. In the plots 128, 130, the horizontal axis corresponds to time and the vertical axis corresponds to power consumption, current, voltage, and/or the like. Plots 132, 134 describe spectrums, with the plot 132 describing a spectrum from an observed system profile data (an observed spectrum) and the plot 134 describing a spectrum from expected system profile data (an expected spectrum). In the plots 132, 134, the horizontal axis represents frequency and the vertical axis represents time.

The processor 114 may be configured to compare observed system profile data and expected system data, for example, by comparing power profile data of the expected and observed system profile data, spectrums of the expected and observed system profile data, and/or other properties of the observed system profile data and the expected system profile data. If the observed system profile data matches the expected system profile data, it may indicate that the powered system 101, including the components of the load 106, are operating as expected. If the observed system profile data does not match the expected system profile data, it may indicate that the components of the load 106 are not operating as expected. This may occur, for example, if the powered system is misconfigured, malfunctioning, or compromised by an attack from a malicious actor.

When the processor 114 determines that the observed system profile data does not match the expected system profile data, it may perform a remedial action. In some examples, the remedial action comprises sending an alert message 124 to a process control system 104. The alert message 124 may describe a deviation between the observed system profile data and the expected system profile data. The process control system 104 may, in some examples, use the alert message 124 to perform an additional remedial action such as, for example, providing an alert to appropriate personnel, shutting down the power supply 102, shutting down one or more components of the load 106, and/or the like. In some examples, the remedial action performed by the processor 114 may include shutting down the power supply 102, shutting down one or more components of the load 106, and/or the like.

Figure 2:
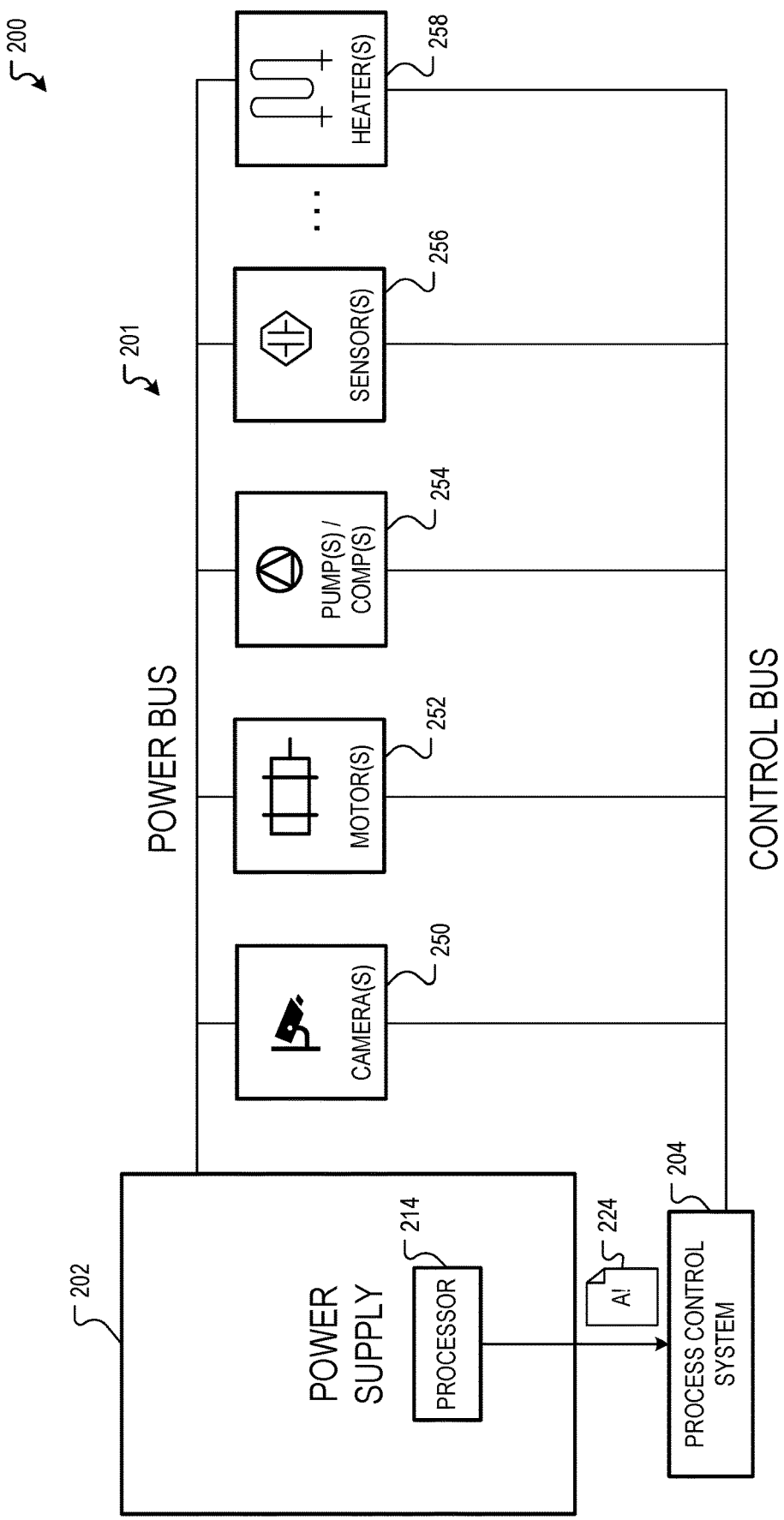
FIG. 2 is a diagram showing another example of an environment comprising a powered system and a process control system.

FIG. 2 is a diagram showing one example of an environment 200 comprising a powered system 201 and a process control system 204. The powered system comprises a power supply 202 providing an output electrical signal to a load comprising various components 250, 252, 254, 256, 258. A power supply 202 comprises a processor 214 and may be programmed to perform powered system monitoring, as described herein. For example, the processor 214 may receive one or more sensor signals describing an output electrical signal or other indicator of an output electrical signal of the power supply 202. The processor 214 may compare the at least one sensor signal (e.g., observed system profile data derived from the at least one sensor signal) to expected system profile data for the powered system 201, as described herein. If there is no match to the expected system profile data, the processor 214 may execute a remedial action, as described herein. For example, the remedial action may include sending an alert message to 224 to a process control system 204, shutting down the power supply 202, shutting down one or more of the 250, 252, 254, 256, 258, and/or the like.

The components 250, 252, 254, 256, 258 provide examples of components that may be part of the load of a powered system. For example, component 250 may include one or more cameras or other image sensors. Component 252 may include one or more motors, actuators, and/or the like. Component 254 may include one or more pumps, compressors, and/or the like. Component 256 may comprise one or more sensors. Component 258 may comprise one or more heaters, heating elements, and/or the like. The example components 250, 252, 254, 256, 258 provide examples of components that may make up a load of a powered system. It will be appreciated that, in various examples, a powered system may comprise various different combinations of example components 250, 252, 254, 256, 258 and/or other components in various numbers.

Figure 3:
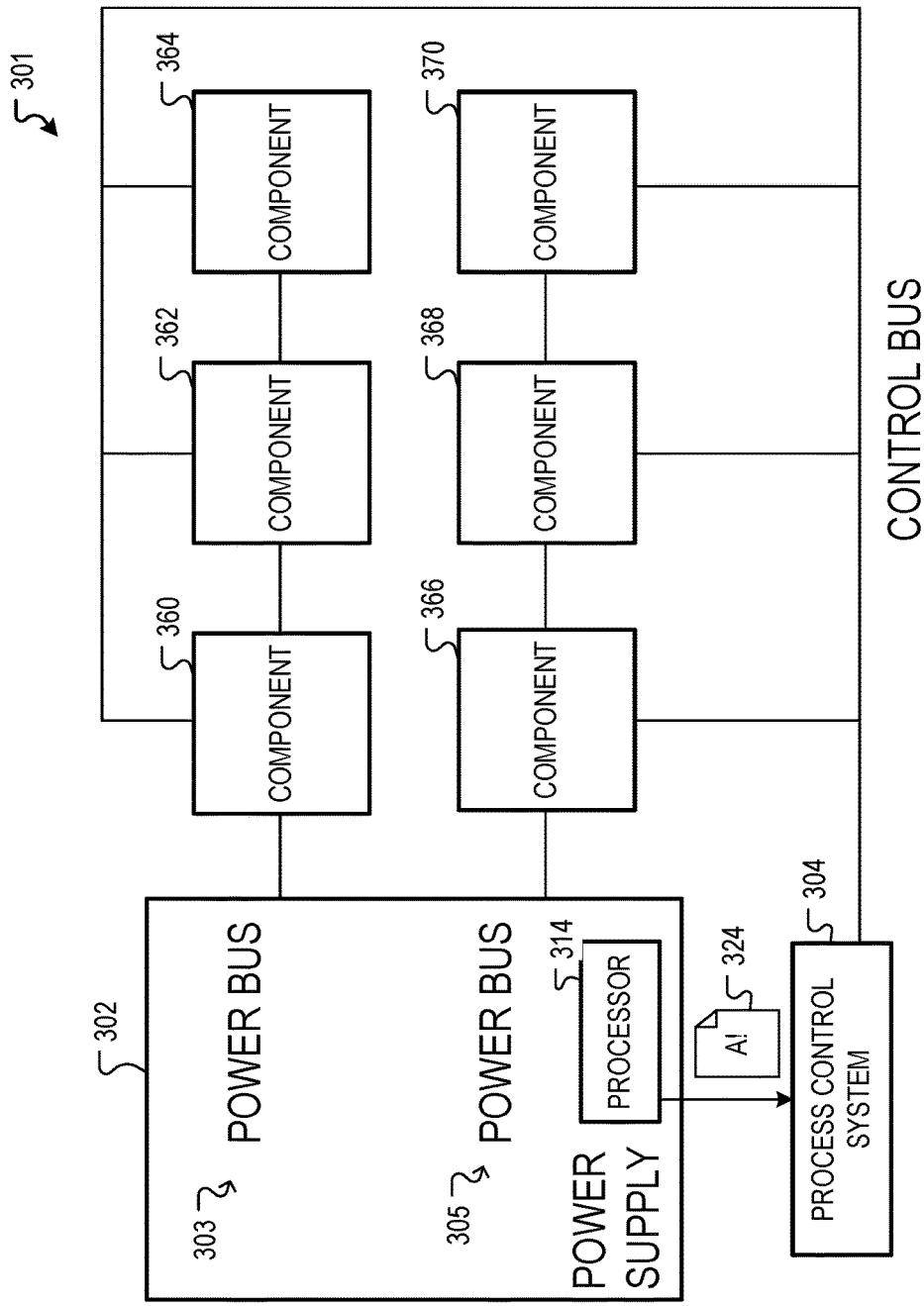
FIG. 3 is a diagram showing one example of an environment comprising a powered system having multiple power busses and a process control system.

FIG. 3 is a diagram showing one example of an environment 300 comprising a powered system 301 and a process control system 304. The powered system 301 comprises a power supply 302 provides an output electrical signal to a load comprising various components 360, 362, 364, 366, 368, 370. The power supply 302 comprises a processor 314 and may be programmed to perform powered system monitoring, as described herein. For example, the processor 314 may receive one or more sensor signals describing an output electrical signal or other indicator of an output electrical signal of the power supply 302. The processor 314 may compare the at least one sensor signal (e.g., observed system profile data derived from the at least one sensor signal) to expected system profile data for the powered system 301, as described herein. If there is no match to the expected system profile data, the processor 314 may execute a remedial action, as described herein. For example, the remedial action may include sending an alert message to 324 to a process control system 304, as described herein.

In the example environment 300, the power supply 302 comprises two power buses 303, 305. The power bus 303 may provide power to components 360, 362, 364 and the power bus 305 may provide power to components 366, 368, 370. The power buses 303, 305 may provide different output electrical signals to the respective components. For example, the power bus 303 may provide an output electrical signal at a first voltage and the power bus 305 may provide an output electrical signal at a second voltage different than the first voltage. Also, in some examples, the power bus 303 may provide an output electrical signal that can support a first maximum current and the power bus 305 may provide an electrical signal that can support a second maximum current different than the first maximum current. The power supply 302 may comprise sensors for monitoring both power buses 303, 305. Also, although two power buses 303, 305 are shown, it will be appreciated that power supplies 302 may have and may more than two power buses.

The processor 314 may be programmed to analyze system profile data describing both the power bus 303 and the power bus 305. In some examples, the expected system profile data may comprise expected system profile data describing the power bus 303 and distinct expected system profile data describing the power bus 305. Processor 314 may collect respective observed system profile data describing each of the power buses 303, 305 individually. The processor 314 may be programmed to detect a deviation between the expected system profile data and the observed system profile data if a deviation is detected with respect to the power bus 303 or with respect to the power bus 305. In some examples, the processor 314 may be programmed to detect a deviation between the expected system profile data and the observed system profile data for the power supply only if a deviation is detected with respect to both the power bus 303 and the power bus 305. Also, in some examples, behavior of the power buses 303, 305 may be described by common expected system profile data and observed system profile data. The processor 314 may be programmed to compare the common expected system profile data and the observed system profile data, for example, as described herein.

Figure 4:
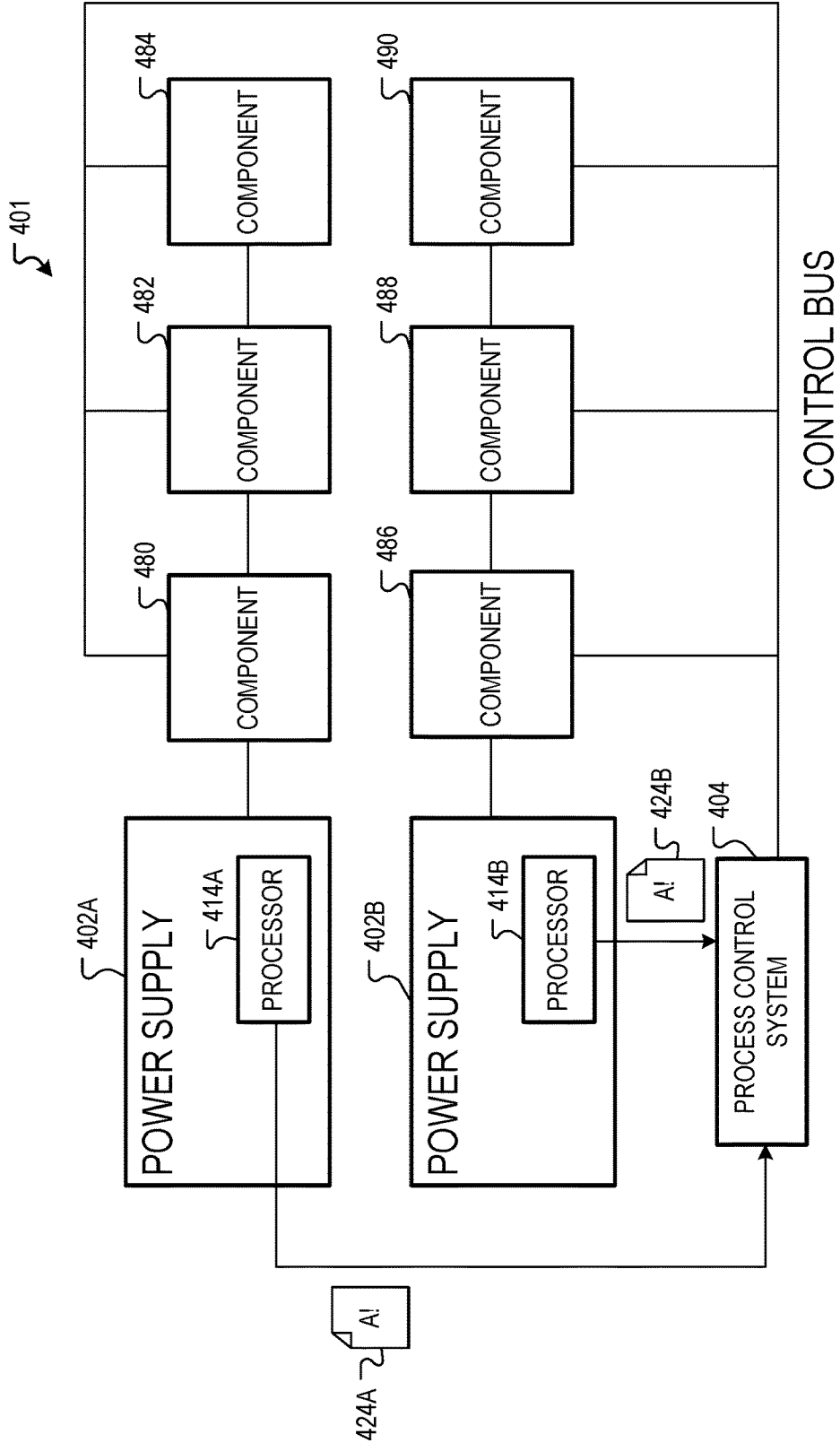
FIG. 4 is a diagram showing one example of an environment comprising a powered system comprising two power supplies and a process control system.

FIG. 4 is a diagram showing one example of an environment 400 comprising a powered system 401 comprising two power supplies 402A, 402B and a process control system 404. The power supply 402A provides power to components 480, 482, 484. The power supply 402B provides power to components 486, 488, 490. The power supplies 402A, 402B comprise respective processors 414A, 414B that may be programmed to perform power system monitoring, for example, as described herein. For example, the processor 414A may receive one or more sensor signals describing an output electrical signal or other indicator of an output electrical signal of the power supply 402A. The processor 414A may compare the at least one sensor signal (e.g., observed system profile data derived from the at least one sensor signal) to expected system profile data for the components 480, 482, 484. If there is no match to the expected system profile data, the processor 414A may execute a remedial action, such as, for example, sending an alert message 424A to a process control system 404. The processor 414B may compare the at least one sensor signal (e.g., observed system profile data derived from the at least one sensor signal) to expected system profile data for the components 486, 488, 490. If there is no match to the expected system profile data, the processor 414B may execute a remedial action, such as, for example, sending an alert message 424B to a process control system 404.

In some examples, the respective processors 414A, 414B may access separate expected system profile data. For example, the processor 414A may access expected system profile data describing the components 480, 482, 484. The processor 414A may generate observed system profile data for the components 480, 482, 484 and compare the observed system profile data to the corresponding expected system profile data to determine a deviation, if any. In parallel, the processor 414B may access expected system profile data describing the components 486, 488, 490 and may generate observed system profile data for the components 486, 488, 490. The processor 414B may compare the observed system profile data to the corresponding expected system profile data to determine a deviation if any. In some examples, one of the processors 414A, 414B compares expected system profile data and observed system profile data describing the powered system 401 as a whole. For example, one processor 414A, 414B may provide the other processor 414A, 414B with observed sensor data and/or observed system profile data captured at the respective power supply 402A, 402B.

In another example embodiment, the processors 414A8, 414B may be programmed to gather observed system profile data describing the respective components 480, 482, 484, 486, 488, 490 and provide the observed system profile data to the process control system 404. The process control system 404 may access expected system profile data describing all of the components 480, 482, 484, 486, 488, 490. The process control system 404 may compare the observed system profile data received from the respective processors 414A, 414B to detect a deviation, if any.

Figure 5:
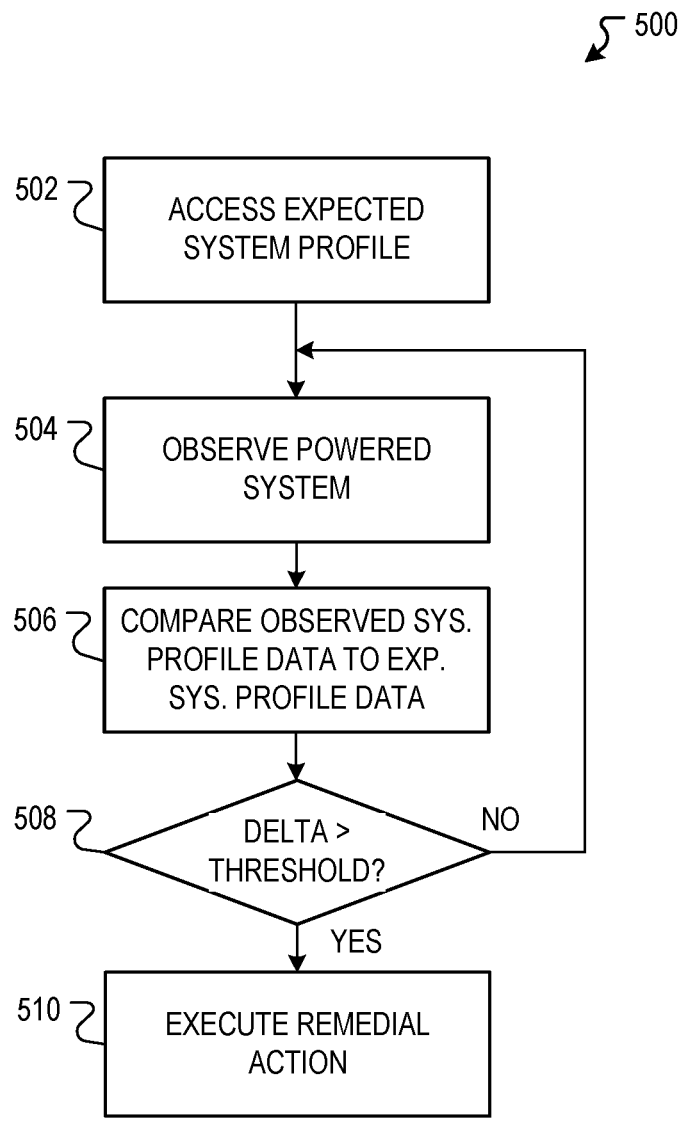
FIG. 5 is a flowchart showing one example of a process flow that may be executed, for example, in any of the environments of FIGS. 1-4 to monitor a powered system.

FIG. 5 is a flowchart showing one example of a process flow 500 that may be executed, for example, in any of the environments 100, 200, 300, 400 to monitor a powered system. For example, the process flow 500 may be performed by a processor of a power supply, such as by one or more of the processors 114, 214, 314, 414A, 414B. At operation 502, the processor accesses expected system profile data. The expected system profile data describes the output electrical signal (or signals) provided to components of a powered system over time. The expected system profile data may be generated in any suitable manner. In some examples, the expected system profile data is generated deterministically based on expected operation of the powered system. In other examples, the expected system profile data is determined by observation of the operation of the powered system and/or of one or more other equivalent powered systems. As described herein, the expected system profile data may indicate, for example, one or more peak patterns, one or more spectrums, and/or the like.

At operation 504, the processor observes the operation of the powered system. This may include, for example, receiving sensor signals from one or more sensors such as, for example, the input sensor 108, the output sensor 110, and/or the output common sensor 111. The processor may perform various preprocessing on the sensor signals. For example, the processor may apply an FFT, STFT, or other suitable algorithm for finding a spectrum of the powered system using the one or more sensor signals. In some examples, the processor may compile the received sensor signal or signals to generate a power profile of the powered system. The observation at operation 504 may result in observed system profile data describing the operation of the powered system.

At operation 506, the processor may compare the observed system profile data and the expected system profile data. This may include various different comparisons including, for example, as described with respect to FIGS. 6-8. At operation 508, the processor may determine if a difference between the observed system profile data and the expected system profile data is greater than a threshold difference. The threshold may be determined in any suitable manner, for example, as described herein with respect to FIGS. 6-8. If the difference between the observed system profile data and the expected system profile data is greater than the threshold distance, then the processor may execute a remedial action at operation 510. If the difference between the observed system profile data and the expected system profile data is not greater than the threshold difference, then the processor may continue to observe the powered system at operation 504.

Figure 6:
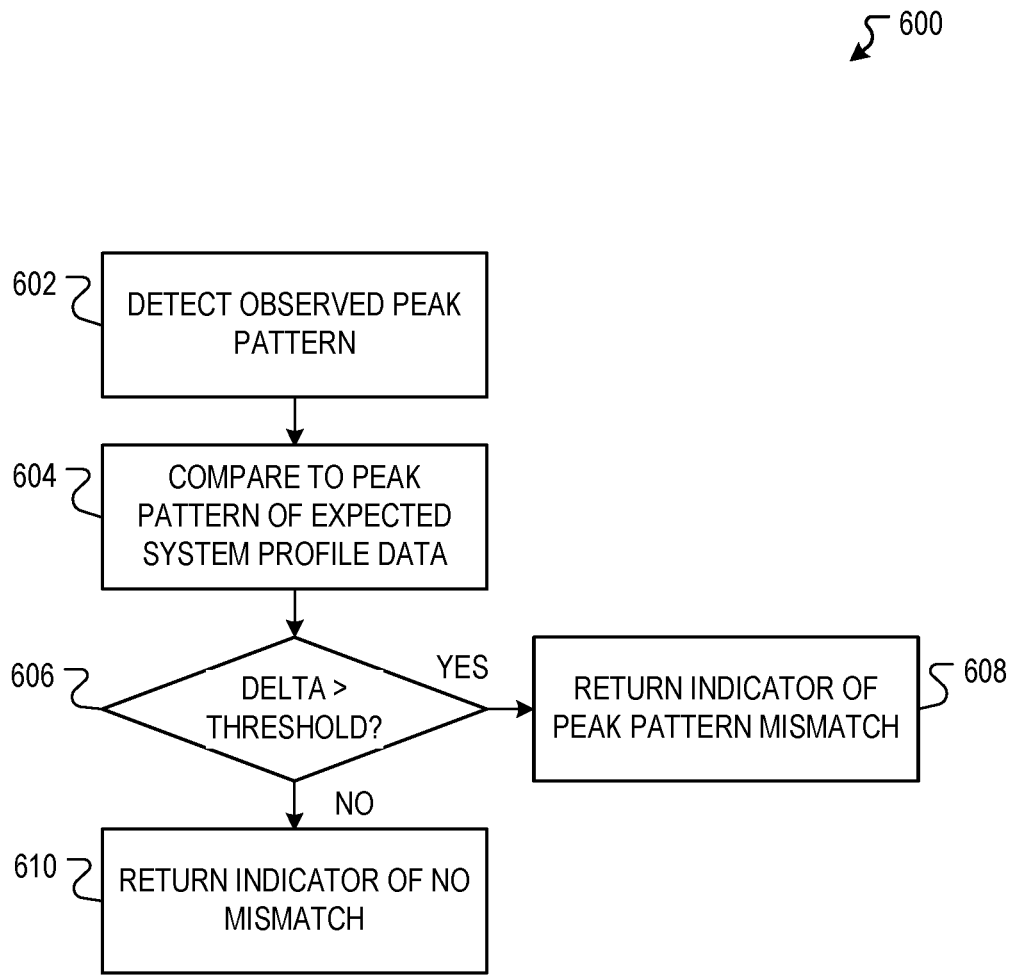
FIG. 6 is a flowchart showing one example of a process flow that may be executed, for example, in any of the environments of FIGS. 1-4 to detect a deviation between observed system profile data and expected system profile data utilizing power profile data.

FIG. 6 is a flowchart showing one example of a process flow 600 that may be executed, for example, in any of the environments 100, 200, 300, 400 to detect a deviation between observed system profile data and expected system profile data. For example, FIG. 6 shows one example way of executing the operations 506, 508 from the process flow 500. In the example of FIG. 6, the expected system profile data comprises an expected peak pattern. The expected peak pattern describes magnitudes and positions for peaks in the output electrical signal generated by the power supply according to expected operation of the powered system (e.g., according to one or more cycles of the control routine). Individual peaks of the peak pattern may indicate a peak in current drawn from the power supply, a peak in voltage provided by the power supply, a peak in power provided by the power supply, and/or the like.

At operation 602, a processor associated with the power supply may detect an observed peak pattern from one or more sensor signals at the power supply. The observed peak pattern may indicate magnitudes and positions for peaks in the output electrical signal generated by the power supply. At operation 604, the processor may compare the observed peak pattern to the expected peak pattern. Various different comparison techniques may be used. In some examples, the processor may attempt to match individual peaks. For example, the processor may match individual peaks from the expected peak pattern to corresponding peaks in the observed peak pattern. An individual peak from the observed peak pattern may match an individual peak from the expected peak pattern if its position in time is within a time threshold of the individual peak from the expected peak pattern and its magnitude is within a magnitude threshold of the individual peak from the expected peak pattern.

At operation 606, the processor may determine if a difference between the expected peak pattern and the observed peak pattern is greater than a threshold. The difference may be expressed in various different ways. In some examples, the difference is expressed as a number of peaks from the observed peak pattern that match corresponding peaks in the expected peak pattern. In other examples, the differences expressed are based on differences between corresponding peaks in the observed peak pattern and the expected peak pattern. For example, each attempted match between a peak in the observed peak pattern and a corresponding peak in the expected peak pattern may be described by a time difference and a magnitude difference. This may be converted to a cumulative difference over the observed peak pattern.

If the difference between the expected peak pattern and the observed peak pattern is greater than the threshold, then the processor may return an indicator that the observed peak pattern does not match the expected peak pattern at operation 608. If the difference between the expected peak pattern and the observed peak pattern is not greater than the threshold at operation 606, the processor may, at operation 610, return an indication that there was no detected deviation between the expected peak pattern and the observed peak pattern.

Figure 7:
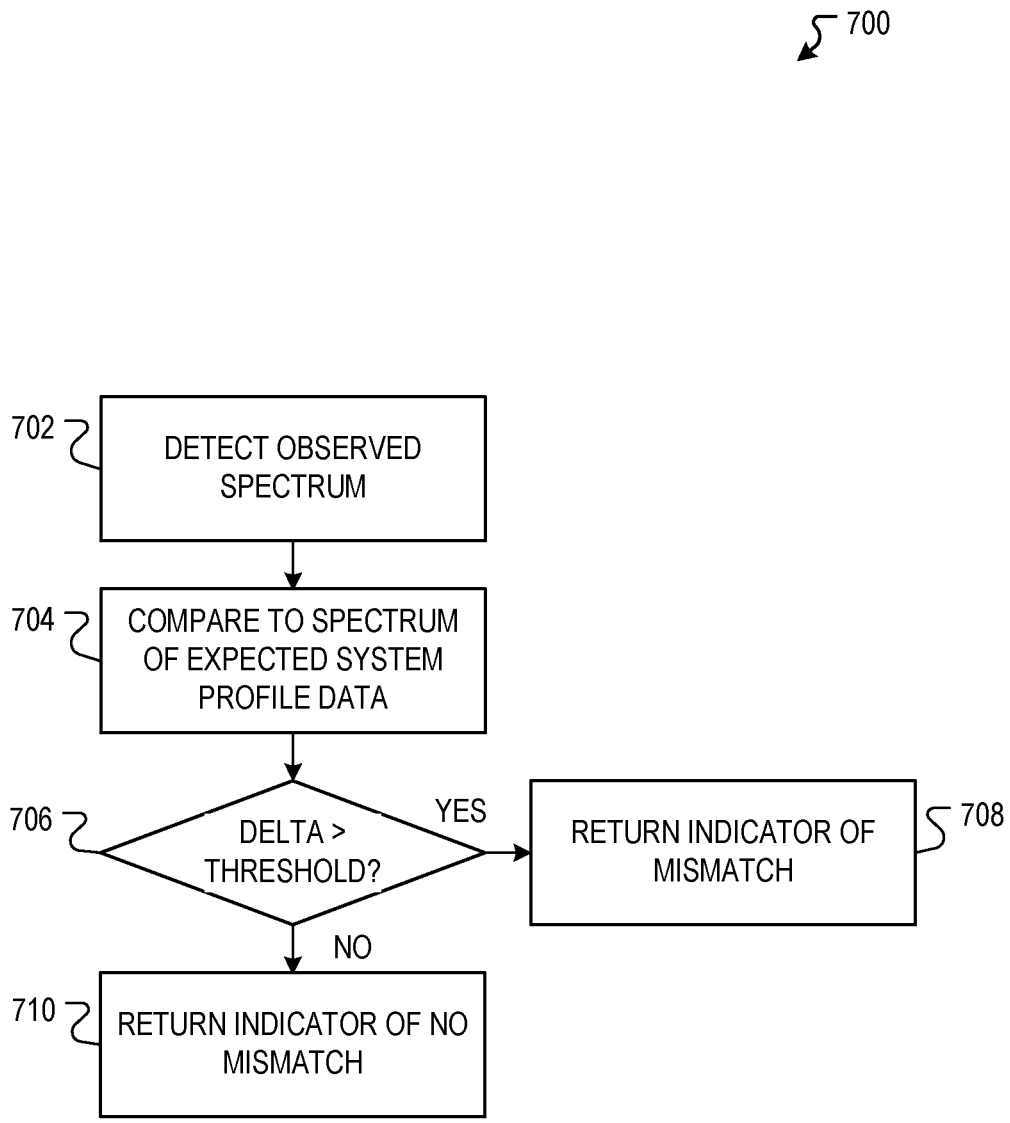
FIG. 7 is a flowchart showing one example of a process flow that may be executed, for example, in any of the environments to detect a deviation between observed system profile data and expected system profile data utilizing spectrum data.

FIG. 7 is a flowchart showing one example of a process flow 700 that may be executed, for example, in any of the environments 100, 200, 300, 400 to detect a deviation between observed system profile data and expected system profile data. For example, FIG. 7 shows another example way of executing the operations 506, 508 from the process flow 500. In the example of FIG. 7, the expected system profile data comprises spectrum data describing an expected spectrum of the electrical output signal generated by the power supply. The expected spectrum may indicate a frequency content of the electrical output signal. The expected spectrum may be based on any suitable metric describing the electrical output signal generated by the power supply such as, for example, current drawn from the power supply, voltage provided by the power supply, power provided by the power supply, and/or the like.

At operation 702, the processor may detect an observed spectrum of the power supply. The observed spectrum may be generated from sensor signals provided by one or more sensors such as, for example, one or more of the sensors 108, 110, 111. Detecting the observed spectrum may involve converting one or more received sensor signals from the time to the frequency domain. This may include applying a transformed algorithm such as, for example, an FFT or STFT algorithm.

At operation 704, the processor may compare the observed spectrum to an expected spectrum indicated by the expected system profile data. In some examples, comparing an observed spectrum to an expected spectrum may include determining a distance metric describing a distance between the observed spectrum and the expected spectrum. If, at operation 706, the distance metric is greater than a threshold, then, at operation 708, the processor may return an indication of a mismatch between the observed spectrum and the expected spectrum. If, at operation 706, the distance metric is not greater than the threshold, then, at operation 710, the processor may return an indicator of no mismatch between the observed spectrum in the expected spectrum.

One example way of determining a distance metric between an expected spectrum and an observed spectrum includes binning the expected spectrum and the observed spectrum and comparing corresponding frequency bins. The frequency bins may be selected in any suitable manner. In some examples, the spectrum may be divided into a series of equal frequency bins. Corresponding frequency bins between the expected spectrum and the observed spectrum may be frequency bins over an equivalent range of frequencies. The distance metric may consider each set of corresponding frequency bins and determine whether the bins are paired or isolated. Initially, the processor may determine whether a considered set of corresponding frequency bins are paired. In some examples, two corresponding bins may be considered paired if the condition of Expression [2] is met and isolated if the condition of Expression [2] is not met.

$$b_e.freq - b_o.freq < \text{threshold} \quad [2]$$

In Expression [2], $b_e$ indicates a frequency bin from the expected spectrum and $b_o$ indicates a corresponding frequency bin from the observed spectrum. If the two considered frequency bins are paired, a distance metric for the bins may be determined based on the frequency and amplitude of the paired frequency bins, for example, according to Equation [3] below:

$$Dist_{paired} += |b_e.freq - b_o.freq| * |b_e.amp - b_o.amp| \quad [3]$$

If the considered frequency bins are not paired, and therefore considered isolated, a distance metric for the frequency bins may be determined, for example, according to Equation [4] below:

$$Dist_{isolated} += thresh + \left| \frac{b_e}{b_o}.amp - Avg\left(\frac{ES}{OS}\right) \right| \quad [4]$$

In Equation [4], $b_o/b_e$·amp describes a ratio of the amplitude of the corresponding frequency bins. $Avg(_{OS}/^{ES})$ describes an average ratio of amplitudes over all frequency bins. In this way, the processor may determine a distance metric for each set of corresponding frequency bins.

In addition to determining distance metrics for each corresponding set of frequency bins, the processor may determine a distance between the average amplitude of the expected spectrum and the average amplitude of the observed spectrum, for example, as provided by Equation [5] below:

$$Dist_{avg} = |Avg(ES) = Avg(OS)| \quad [5]$$

In this example, the total distance metric between the expected spectrum and the observed spectrum may be found by summing the distance metrics for paired frequency bins, the distance metrics for isolated frequency bins, and the average distance between the two spectrums, for example, as shown by Equation [6] below:

$$Dist_{oe} = Dist_{paired} + Dist_{isolated} + Dist_{avg} \quad [6]$$

In some examples, such as those utilizing the STFT transform, an expected spectrum and observed spectrum may be taken over a plurality of time windows. When this occurs, the processor may determine a difference between the expected spectrum and the observed spectrum, for example, by determining a distance metric as described herein with respect to Equations/Expressions [2]-[6]. Distance metrics over all considered time windows may be summed to provide a total distance metric describing a distance between the observed spectrum and the expected spectrum over all time windows.

Figure 8:
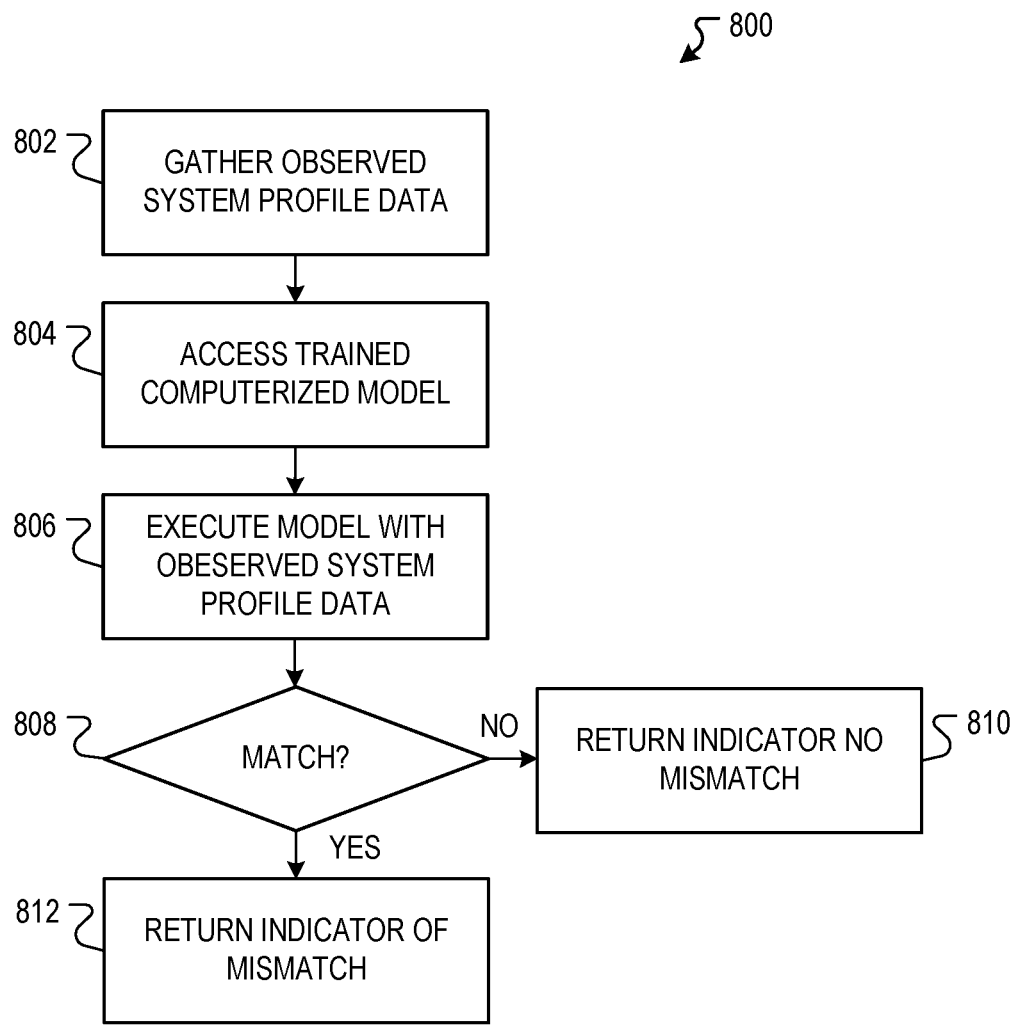
FIG. 8 is a flowchart describing one example or a process flow that may be executed, for example, in any of the environments of FIGS. 1-4 to detect a deviation between observed system profile data and expected system profile data using a trained computerized model.

FIG. 8 is a flowchart describing one example or a process flow 800 that may be executed, for example, in any of the environments 100, 200, 300, 400 to detect a deviation between observed system profile data and expected system profile data using a trained computerized model. For example, FIG. 8 shows one example way of executing the operations 506, 508 from the process flow 500.

At operation 802, the processor may gather observed system profile data. The observed system profile data may include any data describing the powered system such as, for example, one or more sensor signals from one or more sensors 108, 110, 111. At operation 804, processor may access a trained computerized model. The trained computerized model may be any suitable type of model such as, for example, a supervised learning model or an unsupervised learning model. In some examples, the trained computerized model is a classification model that is trained to receive observed system profile data as an input or inputs and return an indication of whether the observed system profile data matches expected system profile data for the powered system. Example classification model algorithms that may be used include, for example, logistic regression models, k-nearest neighbor models, decision tree models, support Vector machine models, naïve Bayes models, and/or the like.

The computerized model, in some examples, is trained by the processor. For example, the processor may access training data. The training data may be or include the expected system profile data describing expected and/or typical operation range of the powered system. The processor may utilize the expected system profile data to train the computerized model to return an output indicating whether observed system profile data matches or does not match the expected system profile data range.

At operation 806, the processor may execute the trained computerized model using the observed system profile data as input. The executed computerized model may provide an output classifying the observed system profile data as matching or not matching the expected system profile data. If, at operation 808, the output of the trained computerized model indicates that the observed system profile data matches the expected system profile data, then the processor may, at operation 810, return an indication of no mismatch. If, at operation 808, the output of the trained computerized model indicates that the observed system profile data does not match the expected system profile data, then the processor may, at operation 812, return an indication of a mismatch. Returning an indication of a mismatch may indicate that the monitoring system has detected that the powered system is operating outside of the expected normal operation profile range.

Figure 9:
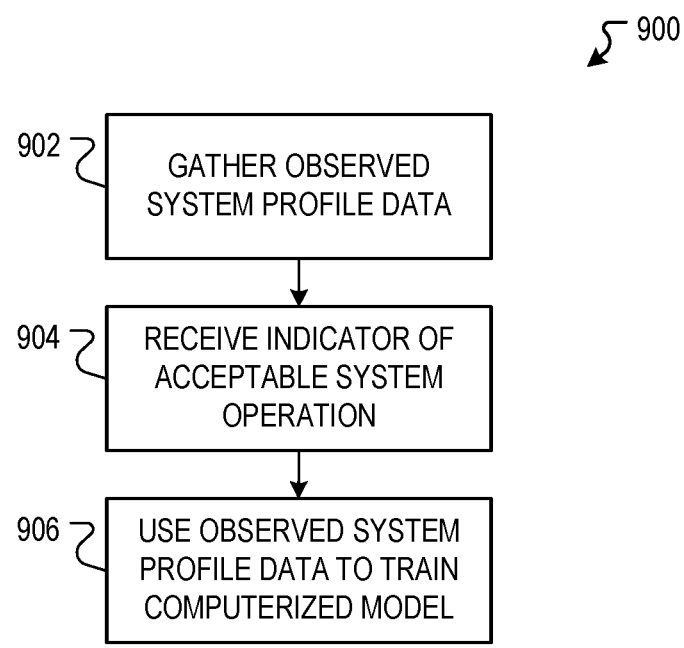
FIG. 9 is a flowchart showing one example of a process flow showing how the processor may, in some examples, train the trained computerized model for detecting a mismatch between expected system profile data and observed system profile data.

FIG. 9 is a flowchart showing one example of a process flow 900 showing how the processor may, in some examples, train the trained computerized model for detecting a mismatch between expected system profile data and observed system profile data. At operation 902, the processor may gather observed system profile data. The observed system profile data may be gathered utilizing sensor signals from one or more sensors, such as sensors 108, 110, 111. At operation 904, the processor may receive an indicator that the powered system was operating within accepted parameters during the gathering of the observed system profile data at operation 902. For example, a human user may verify the correct operation of the powered system and provide an indication of the correct operation to the processor.

Based on the indicator of acceptable system operation, the processor may utilize the observed system profile data as training data indicating expected system profile data. The processor, at operation 906, may utilize the observed system profile data to train the computerized model. In some examples, the process flow 900 may be re-executed on a periodic basis. For example, the processor 114 may, at operation 906, retrain an existing model utilizing the additional observed system profile data that has been verified as acceptable at operation 904.

In some examples, a power supply (e.g., a processor thereof) may be programmed to compare observed system profile data against more than one set of expected system profile data. For example, a powered system may operate according to one or more known modifications. Consider the example powered system including security cameras. In some examples, the powered system may modify its sequence of operations, for example, based on received image data. For example, if an image from one or more of the security cameras depicts an anomaly, the powered system may be programmed to capture an additional image from the same security camera before continuing with its normal control routine. Consider also the example powered system for implementing an industrial process. The industrial process may comprise one or more contingencies during which the powered system will operate differently, for example, depending upon the results of an earlier stage of the routine.

Figure 10:
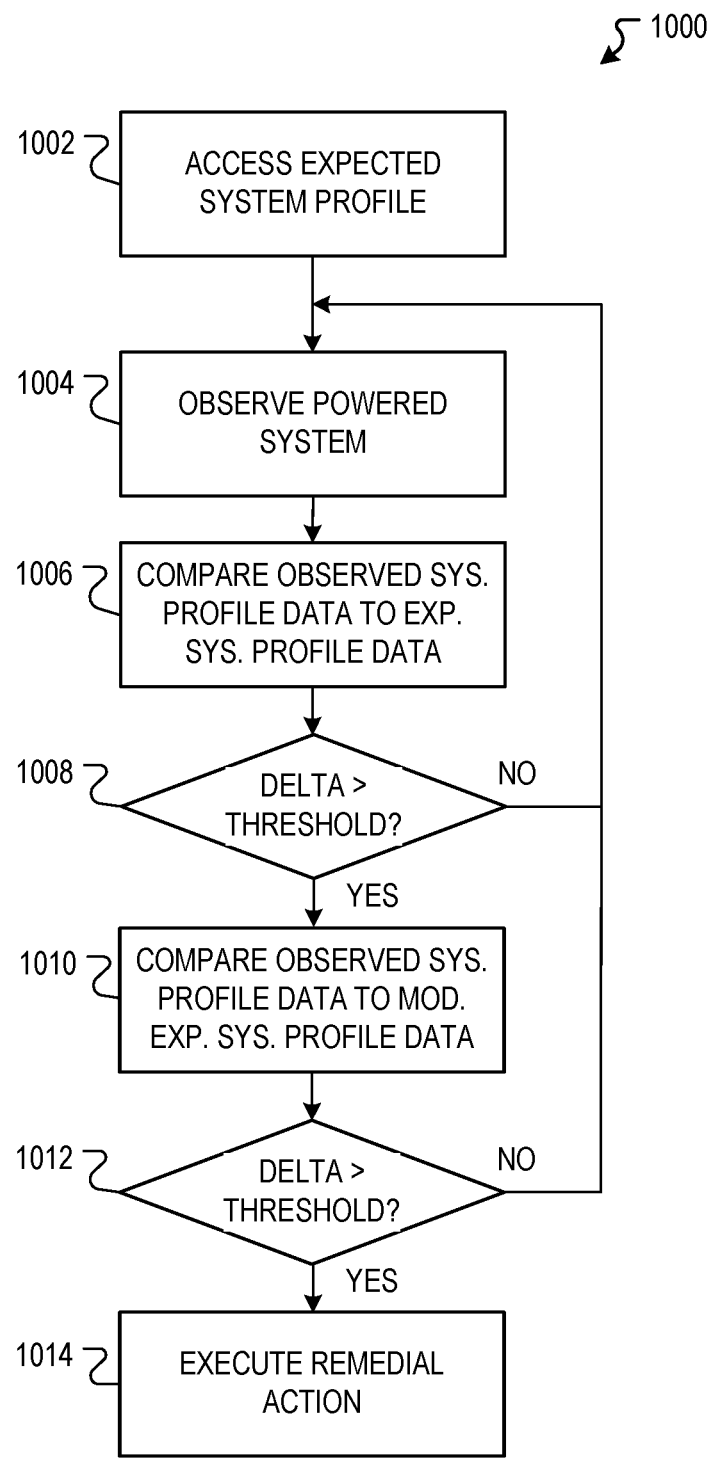
FIG. 10 is a flowchart showing one example of a process flow that may be executed, for example, in any of the environments of FIGS. 1-4 to monitor a powered system according to more than one expected system profile data set.

FIG. 10 is a flowchart showing one example of a process flow 1000 that may be executed, for example, in any of the environments 100, 200, 300, 400 to monitor a powered system according to more than one expected system profile data set. The process flow 1000 may be performed by a processor of a power supply, such as by one or more of the processors 114, 214, 314, 414A, 414B.

At operation 1002, the processor accesses first expected system profile data. The first expected system profile data describes the output electrical signal (or signals) provided to components of a powered system over time. At operation 1004, the processor observes the operation of the powered system. This may include, for example, receiving sensor signals from one or more sensors such as, for example, the input sensor 108, the output sensor 110, and/or the output common sensor 111. The processor may perform various preprocessing on the sensor signals. For example, the processor may apply an FFT, STFT, or other suitable algorithm for finding a spectrum of the powered system using the one or more sensor signals. In some examples, the processor may compile the received sensor signal or signals to generate a power profile of the powered system. The observation at operation 1004 may result in observed system profile data describing the operation of the powered system.

At operation 1006, the processor may compare the observed system profile data and the first expected system profile data. This may include various different comparisons including, for example, as described with respect to FIGS. 6-8. At operation 1008, the processor may determine if a difference between the observed system profile data and the first expected system profile data is greater than a threshold difference. The threshold may be determined in any suitable manner, for example, as described herein with respect to FIGS. 6-8. If the difference between the observed system profile data and the first expected system profile data is greater than the threshold distance, then the processor may execute a remedial action at operation 1010. If the difference between the observed system profile data and the first expected system profile data is not greater than the threshold difference, then the processor may continue to observe the powered system at operation 1004.

If the difference between the observed system profile data and the first expected system profile data is greater than the threshold distance, then the processor may, at operation 1010, compare the observed system profile data to a modified expected system profile data describing a first known modification to the operation of the powered system. If, at operation 1012, the deviation between the observed system profile data and the modified expected system profile data is not greater than a threshold, the processor may continue to observe the powered system at operation 1004. If, at operation 1012, the deviation between the observed system profile data and the modified expected system profile data is greater than the threshold, then the processor may execute a remedial action at operation 1014.

Although the process flow 1000 shows two sets of expected system profile data (the first expected system profile data and the modified expected system profile data), it will be appreciated that a power supply may compare observed system profile data to more than two sets of expected system profile data (for example, if there are more than two known modifications to the behavior of the powered system).

In some examples, the operation of a powered system changes over time as the components age. For example, a new electric motor may draw power differently than an equivalent electric motor in which the various electrical and/or mechanical components of the electric motor have aged. As components of the powered system age, the observed system profile data may begin to deviate from the expected system profile data by virtue of the aging. In various examples, a power supply may be programmed to compensate for aging of components and powered system.

Figure 11:
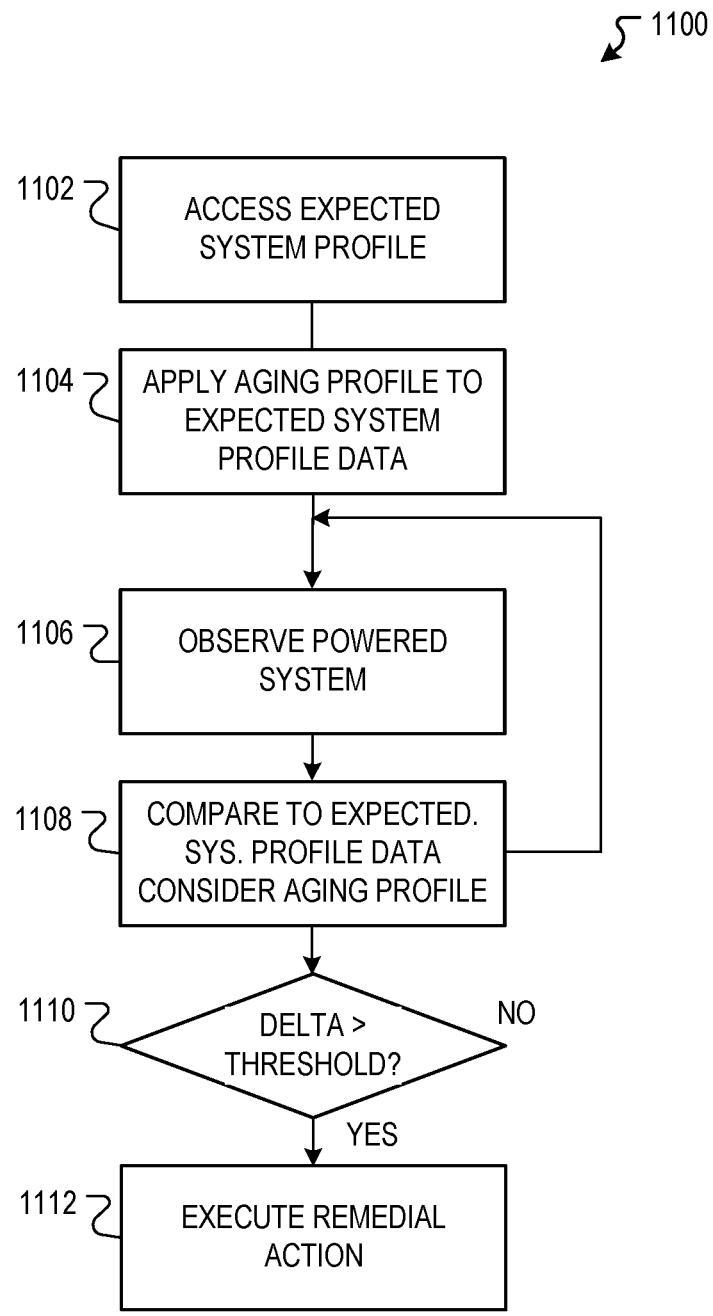
FIG. 11 is a flowchart showing one example of a process flow that may be executed, for example, in any of the environments of FIGS. 1-4 to monitor a powered system considering an aging profile or the powered system.

FIG. 11 is a flowchart showing one example of a process flow 1100 that may be executed, for example, in any of the environments 100, 200, 300, 400 to monitor a powered system considering an aging profile or the powered system. For example, the process flow 1100 may be performed by a processor of a power supply, such as by one or more of the processors 114, 214, 314, 414A, 414B.

At operation 1102, the processor accesses expected system profile data. The expected system profile data describes the output electrical signal (or signals) provided to components of a powered system over time. At operation 1104, the processor applies an aging profile to the expected system profile data. This may include, for example, applying a modification to the expected system profile data based on an age of the powered system. The age may be expressed in any suitable manner such as, for example, a chronological age, a number of control routine cycles executed, and/or the like. In some examples utilizing a trained computerized model, such as described herein with respect to FIG. 7, the age of the powered system may be provided as an input to the trained computerized model in addition to or instead of applying the aging profile to the expected system profile data. Also, in some examples, processor 114 may receive, store, or otherwise access different sets of expected system profile data based on the age of the powered system. In this way, the processor may not affirmatively apply an aging profile to expected system profile data, but may instead access expected system profile data corresponding to the current age of the powered system.

At operation 1106, the processor observes the operation of the powered system. This may include, for example, receiving sensor signals from one or more sensors such as, for example, the input sensor 108, the output sensor 110, and/or the output common sensor 111. The processor may perform various preprocessing on the sensor signals. For example, the processor may apply an FFT, STFT, or other suitable algorithm for finding a spectrum of the powered system using the one or more sensor signals. In some examples, the processor may compile the received sensor signal or signals to generate a power profile of the powered system. The observation at operation 1106 may result in observed system profile data describing the operation of the powered system.

At operation 1108, the processor may compare the observed system profile data and the expected system profile data, as corrected for the age of the powered system. This may include various different comparisons including, for example, as described with respect to FIGS. 6-8. At operation 1110, the processor may determine if a difference between the observed system profile data and the expected system profile data is greater than a threshold difference. The threshold may be determined in any suitable manner, for example, as described herein with respect to FIGS. 6-8. If the difference between the observed system profile data and the expected system profile data is greater than the threshold distance, then the processor may execute a remedial action at operation 1112. If the difference between the observed system profile data and the expected system profile data is not greater than the threshold difference, then the processor may continue to observe the powered system at operation 1106. In some examples, as the age of the powered system changes, the processor may periodically re-execute operations 1102 and 1104.

In some examples, a power supply comprising a processor may be pre-programmed to perform powered system monitoring, as described herein. However, not every user of the power supply may desire to perform powered system monitoring. In various examples, a management system may be utilized to selectively naval and/or disable powered system monitoring in power supplies, for example, power supplies that have been installed to operate with powered systems.

Figure 12:
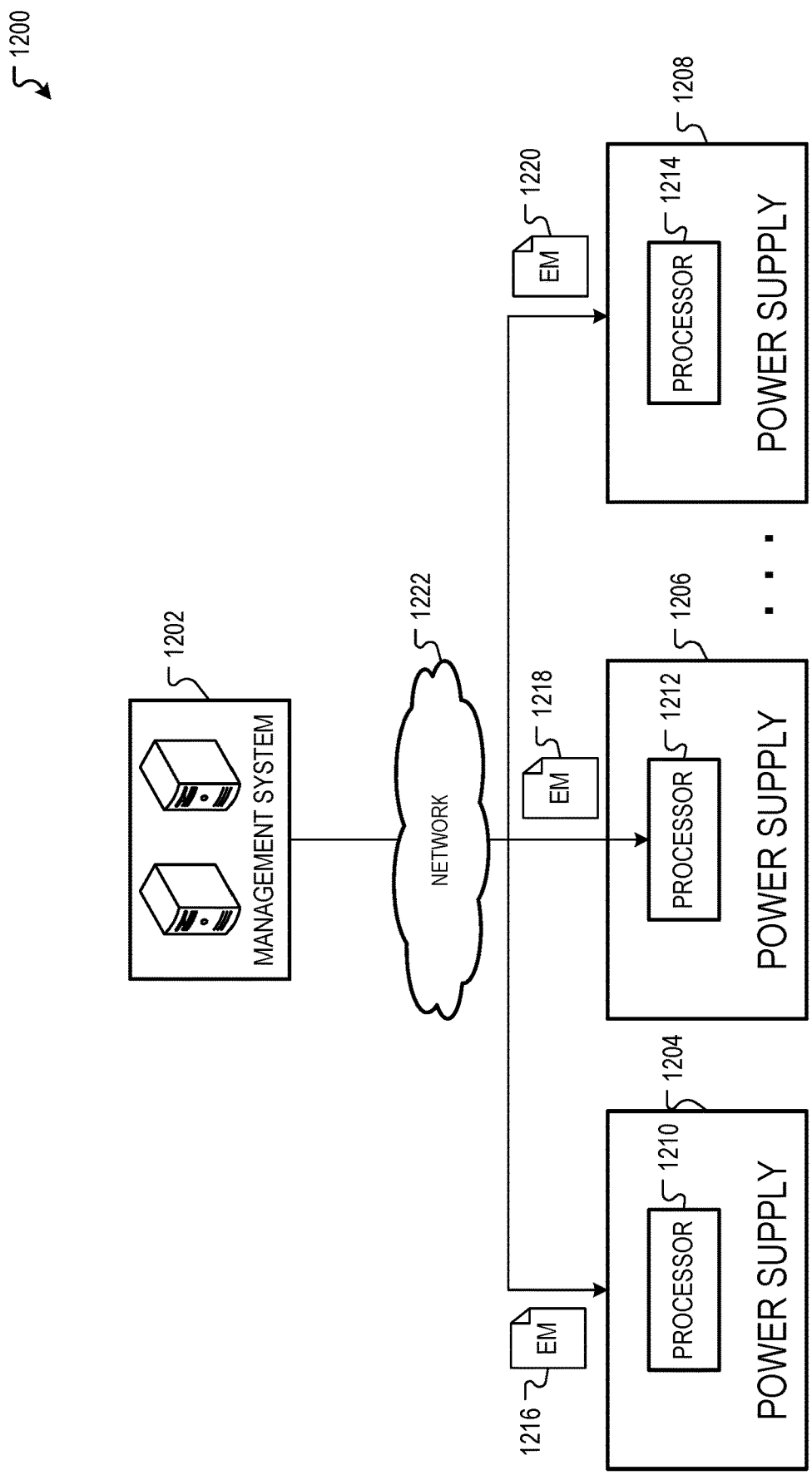
FIG. 12 is a diagram showing one example of an environment comprising a management system and a number of power supplies.

FIG. 12 is a diagram showing one example of an environment 1200 comprising a management system 1202 and a number of power supplies 1204, 1206, 1208. Power supplies 1204, 1206, 1208 may comprise respective processors 1210, 1212, 1214 that are programmed to perform powered system monitoring as described herein. The management system 1202 and power supplies 1204, 1206, 1208 are in communication via a communications network 1222. The communications network 1222 may be any suitable wired or wireless communication network, for example, similar to the communications network 1526 described herein. The management system 1202 may be a programmed computing device that is programmed to manage the power supplies 1204, 1206, 1208. In some examples, the management system 1202 may be implemented by a manufacturer of the power supplies 1204, 1206, 1208. The management system 1202 may be programmed to provide respective enablement messages 1216, 1218, 1220 to power supplies 1204, 1206, 1208 to enable the power supplies for powered system monitoring.

Figure 13:
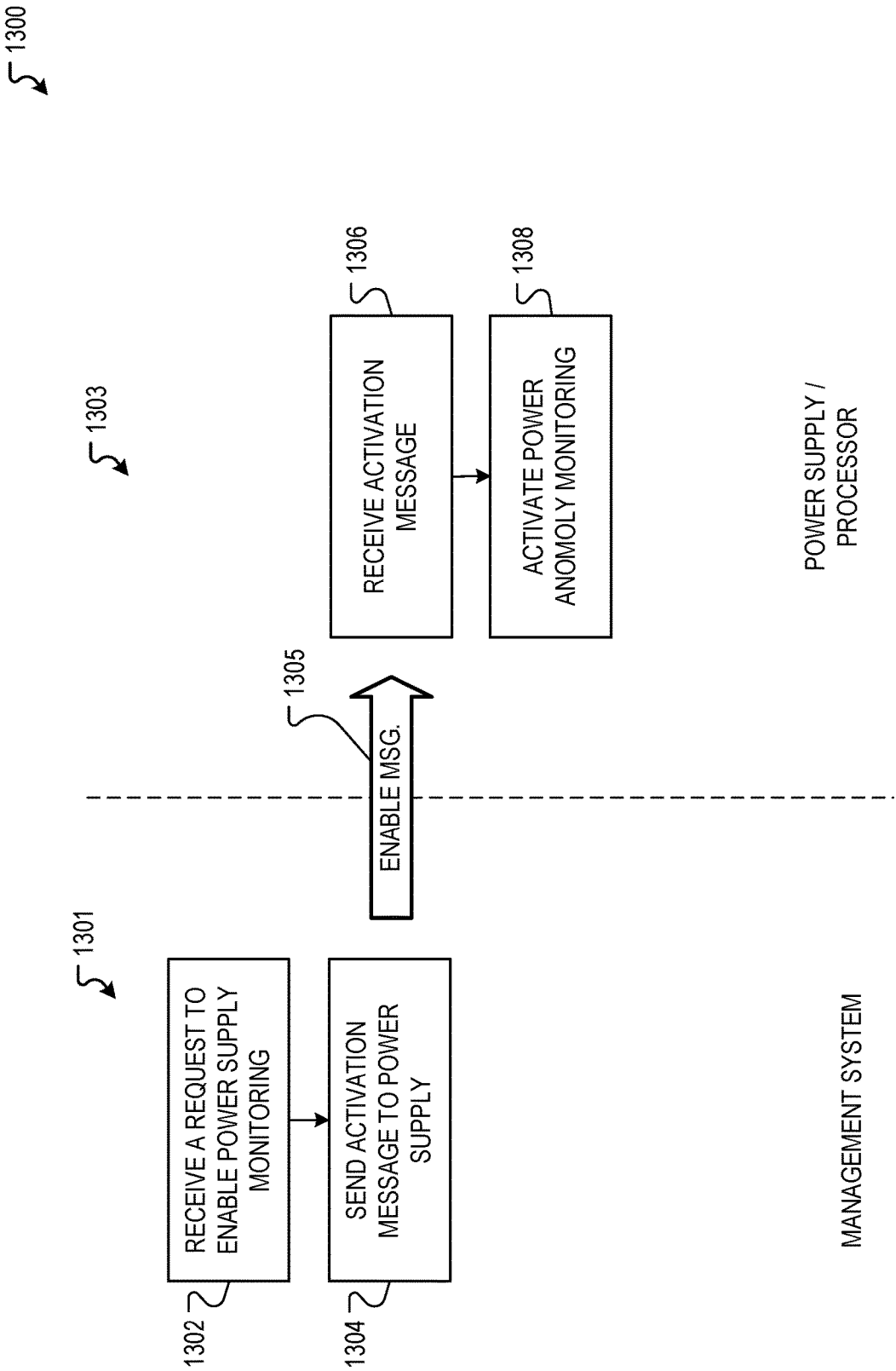
FIG. 13 is a flowchart showing one example of a process flow that may be executed in the environment of FIG. 12 to enable a power supply for powered system monitoring.

FIG. 13 is a flowchart showing one example of a process flow 1300 that may be executed in the environment 1200 to enable a power supply 1204, 1206, 1208 for powered system monitoring. The process flow 1300 comprises two columns 1301, 1303. The column 1301 includes operations that are executed by a management system, such as the management system 1202. The column 1303 includes operations that are executed by a power supply, such as one of the power supplies 1204, 1206, 1208.

At operation 1302, the management system may receive a request to enable powered system monitoring at a power supply. The request may be received, for example, from a proprietor of the power supply who desires to utilize the powered system monitoring capabilities. The request may include an indicator of the power supply to be enabled for system monitoring. For example, the request message may include a serial number, Universal Resource Locator (URL), or other suitable indicator of each power supply to be enabled. In some examples, a single request may indicate multiple power supplies.

At operation 1304, the management system may send an enable message 1305 to the power supply. The enable message 1305 may include an enablement instruction that instructs the power supply to begin performing powered system monitoring, for example, as described herein. In some examples, the enable message 1305 also includes cryptographic data that may be utilized by the power supply to authenticate the enablement message 1305.

The power supply may receive the enable message 1305 at operation 1306 and may, at operation 1308, activate power anomaly monitoring at operation 1308. In examples in which the enable message 1305 comprises cryptographic data, the power supply may verify the cryptographic data prior to activating power anomaly monitoring. For example, the cryptographic data may comprise a digital signature cryptographically generated (e.g., by the management system) using a private key associated with the management system. The power supply (e.g. the processor thereof) may access a public key associated with the management system and utilize the public key to decrypt the digital signature and thereby authenticate the enable message 1305.

In some examples, a processor of a power supply may be programmed to detect one or more particular activities in a powered system. Consider an example in which one or more components of the powered system are provided with access to a communications network. Particular actions to access the component via the communications network may be an indicator of potentially nefarious activity. For example, access to a particular communications port at a component during operation of the powered system may be an indicator of improper or mistaken activity.

In various examples, the processor may be programmed to detect monitored activities, for example, by comparing observed system profile data to monitored activities signature data describing one or more monitored activities. If a monitored activity is detected, the processor may implemented a remedial action, for example, as described herein.

Figure 14:
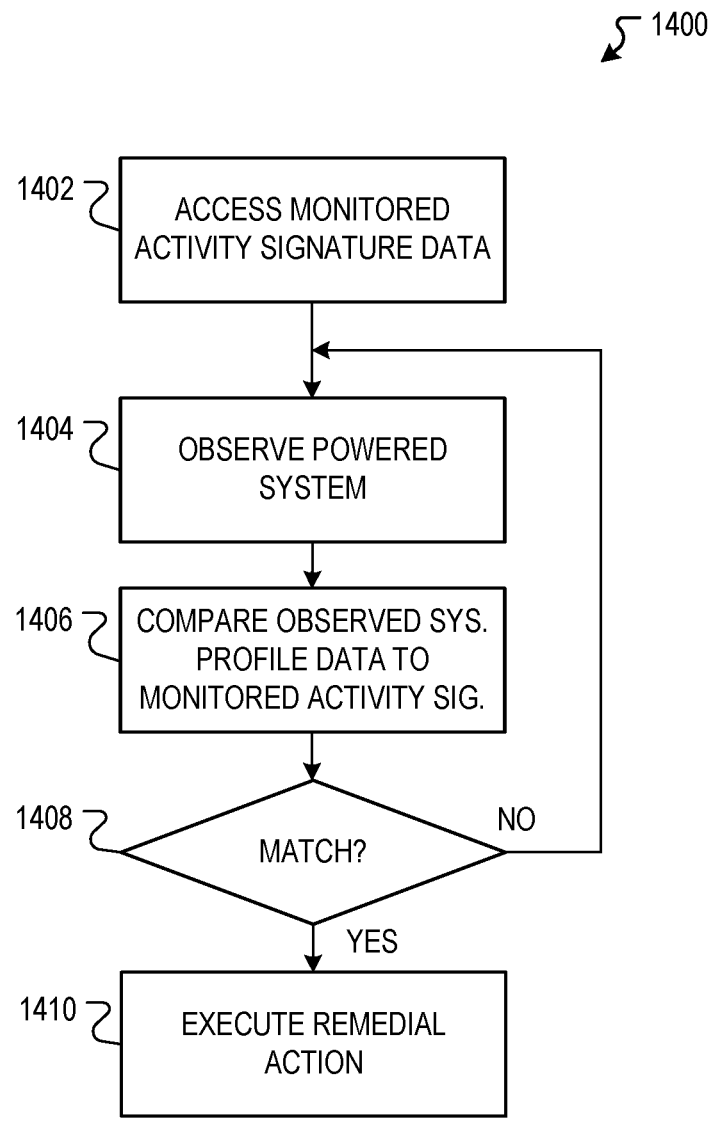
FIG. 14 is a flowchart showing one example of a process flow that may be executed, for example, in any of the environments of FIGS. 1-4 to detect a monitored activity at a powered system.

FIG. 14 is a flowchart showing one example of a process flow 1400 that may be executed, for example, in any of the environments 100, 200, 300, 400 to detect a monitored activity at a powered system. For example, the process flow 1400 may be performed by a processor of a power supply, such as by one or more of the processors 114, 214, 314, 414A, 414B. At operation 1402, the processor may access monitored activity signature data. The monitored activity signature data may describe the operation of the powered system when one or more monitored activities are occurring. In some examples, the monitored activity signature data may be similar to the expected system profile data albeit indicating a particular activity or activities.

At operation 1404, the processor observes the operation of the powered system. This may include, for example, receiving sensor signals from one or more sensors such as, for example, the input sensor 108, the output sensor 110, and/or the output common sensor 111. The processor may perform various preprocessing on the sensor signals. For example, the processor may apply an FFT, STFT, or other suitable algorithm for finding a spectrum of the powered system using the one or more sensor signals. In some examples, the processor may compile the received sensor signal or signals to generate a power profile of the powered system. The observation at operation 1404 may result in observed system profile data describing the operation of the powered system.

At operation 1406, the processor may compare the observed system profile data and the monitored activity signature data. This may include various different comparisons. For example, if the monitored activity signature data comprises spectrum data, the processor may compare the spectrum data to a spectrum indicated by the observed system profile data. Also, if the monitored activity signature data comprises power profile data, the processor may compare the power profile data to a power profile indicated by the observed system profile data. Also, in some examples, monitored activity signature data may include a trained computerized model. Comparing the observed system profile data to the monitored activity signature data may comprise executing the model while providing some or all of the observed system profile data as inputs to the model. An output of the model may classify the observed system profile data as indicating a monitored activity or not indicating a monitored activity.

In some examples, the monitored activity signature data may indicate a single monitored activity or may indicate multiple monitored activities. Comparison of the observed system profile data to the monitored activity signature data may provide a binary result (e.g., monitored activity detected or not detected). In some examples, when a monitored activity is detected, the processor may provide an indication of a particular monitored activity that is detected.

At operation 1408, the processor may determine whether there is a match between the observed system profile data and the monitored activity signature data. If there is a match, then the processor may execute a remedial action at operation 1410. If there is no match, the processor may continue to observed the powered system at operation 1404. It will be appreciated that the process flow 1400 may be executed in addition to or instead of monitoring that includes comparing expected system profile data to the observed system profile data, for example, as described with respect to FIG. 5. In some examples, the processor may concurrently compare the observed system profile data to both expected system profile data and to monitored activity signature data.

Figure 15:
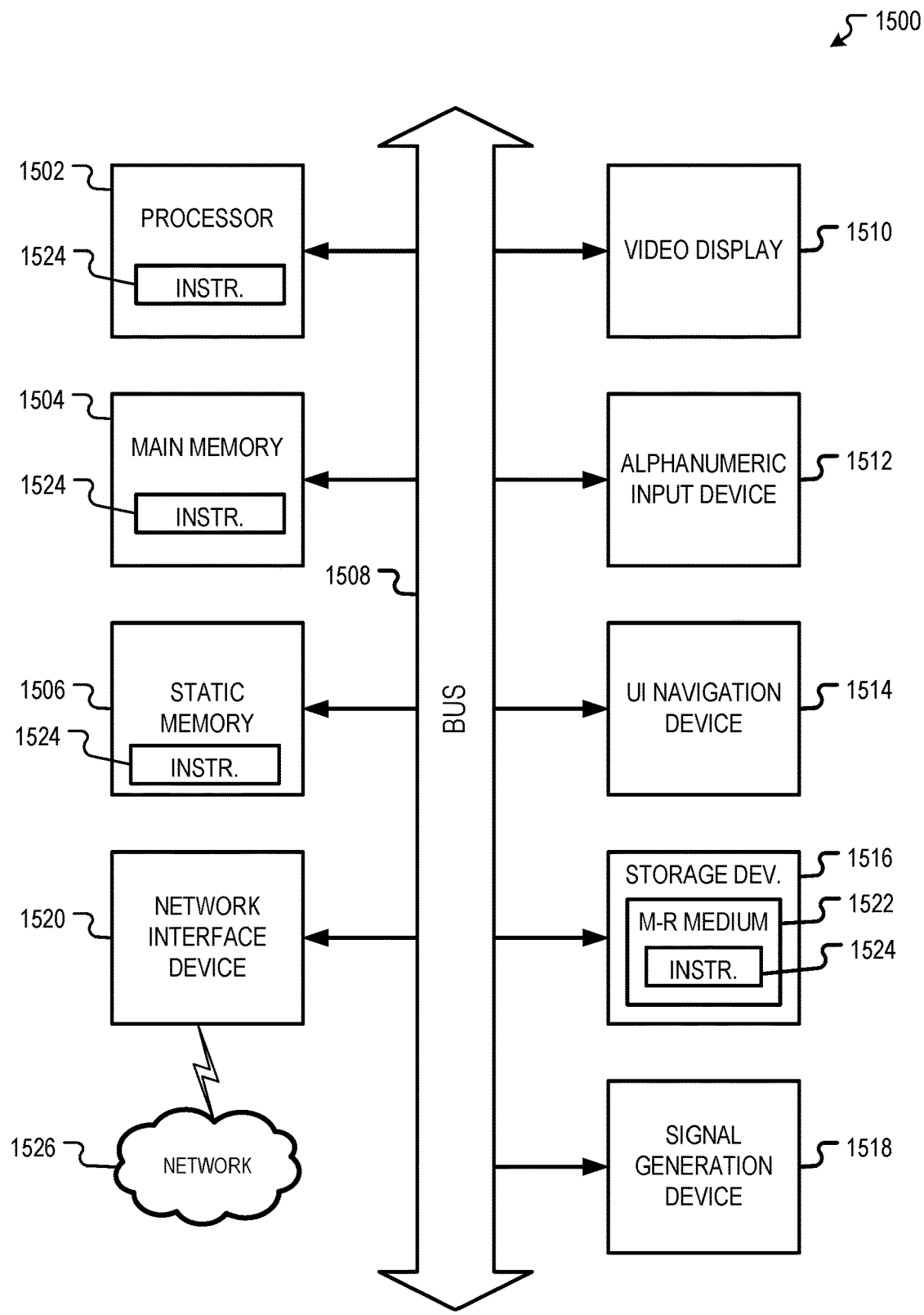
FIG. 15 is a block diagram illustrating a computing device hardware architecture, within which a set or sequence of instructions can be executed to cause a machine to perform examples of any one of the methodologies discussed herein.

FIG. 15 is a block diagram illustrating a computing device hardware architecture 1500, within which a set or sequence of instructions can be executed to cause a machine to perform examples of any one of the methodologies discussed herein. For example, the architecture 1500 may describe one example arrangement of a power supply including a processor, as described herein. The architecture 1500 may operate as a standalone device or may be connected (e.g., networked) to other machines. In a networked deployment, the architecture 1500 may operate in the capacity of either a server or a client machine in server-client network environments, or it may act as a peer machine in peer-to-peer (or distributed) network environments. The architecture 1500 can be implemented in an embedded system, a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1500 includes a processor unit 1502 comprising at least one processor (e.g., a central processing unit (CPU), a graphics processing unit (GPU), or both, processor cores, compute nodes). The architecture 1500 may further comprise a main memory 1504 and a static memory 1506, which communicate with each other via a link 1508 (e.g., a bus). The architecture 1500 can further include a video display unit 1510, an input device 1512 (e.g., a keyboard), and a user interface (UI) navigation device 1514 (e.g., a mouse). In some examples, the video display unit 1510, input device 1512, and UI navigation device 1514 are incorporated into a touchscreen display. The architecture 1500 may additionally include a storage device 1516 (e.g., a drive unit), a signal generation device 1518 (e.g., a speaker), a network interface device 1520, and one or more sensors (not shown), such as a Global Positioning System (GPS) sensor, compass, accelerometer, or other sensor.

In some examples, the processor unit 1502 or another suitable hardware component may support a hardware interrupt. In response to a hardware interrupt, the processor unit 1502 may pause its processing and execute an ISR, for example, as described herein.

The storage device 1516 includes a machine-readable medium 1522 on which is stored one or more sets of data structures and instructions 1524 (e.g., software) embodying or used by any one or more of the methodologies or functions described herein. The instructions 1524 can also reside, completely or at least partially, within the main memory 1504, within the static memory 1506, and/or within the processor unit 1502 during execution thereof by the architecture 1500, with the main memory 1504, the static memory 1506, and the processor unit 1502 also constituting machine-readable media.

Executable Instructions and Machine-Storage Medium

The various memories (1504, 1506, and/or memory of the processor unit(s) 1502) and/or the storage device 1516 may store one or more sets of instructions and data structures (e.g., the instructions 1524) embodying or used by any one or more of the methodologies or functions described herein. These instructions, when executed by the processor unit(s) 1502, cause various operations to implement the disclosed examples.

As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and signal media. Thus, the terms include both storage devices/media and carrier waves/modulated data signals.

The instructions 1524 can further be transmitted or received over a communications network 1526 using a transmission medium via the network interface device 1520 using any one of a number of well-known transfer protocols (e.g., Hypertext Transfer Protocol (HTTP)). Examples of communication networks include a local area network (LAN), a wide area network (WAN), the Internet, mobile telephone networks, plain old telephone service (POTS) networks, and wireless data networks (e.g., Wi-Fi, 3G, 4G Long-Term Evolution (LTE)/LTE-A, 5G, or WiMAX networks).

Various Notes & Examples

Example 1 is a power supply comprising: a regulator circuit configured to generate an output electrical signal; a sensor configured to generate a sensor signal describing the output electrical signal; and at least one processor, the at least one processor programmed to perform operations comprising: determining that the sensor signal fails to match expected system profile data describing an operation of at least one component electrically coupled to the power supply; and responsive to determining that the sensor signal fails to match the expected system profile data, executing a remedial action.

In Example 2, the subject matter of Example 1 optionally includes an enclosure, the regulator circuit, the sensor, and the at least one processor being positioned within the enclosure.

In Example 3, the subject matter of any one or more of Examples 1-2 optionally include the remedial action comprising sending an alert message to a process control system, the alert message describing a deviation of the sensor signal from the expected system profile data.

In Example 4, the subject matter of any one or more of Examples 1-3 optionally include the remedial action comprising initiating a shutdown of the at least one component electrically coupled to the power supply.

In Example 5, the subject matter of any one or more of Examples 1~4 optionally include the operations further comprising: executing a trained computerized model; and accessing an output of the trained computerized model, the output of the trained computerized model being generated from at least one input that is based at least in part on the sensor signal, the output of the trained computerized model indicating that the sensor signal fails to match the expected system profile data.

In Example 6, the subject matter of Example 5 optionally includes the operations further comprising: accessing training data generated using the sensor; and periodically retraining the trained computerized model using the training data.

In Example 7, the subject matter of any one or more of Examples 1-6 optionally include the determining that the sensor signal fails to match the expected system profile data comprising determining that the sensor signal indicates at least one monitored activity at a first component of the at least one component.

In Example 8, the subject matter of any one or more of Examples 1-7 optionally include the determining that the sensor signal fails to match the expected system profile data comprising determining that the sensor signal fails to match modified system profile data describing an operation of the at least one component according to a first known modification.

In Example 9, the subject matter of any one or more of Examples 1-8 optionally include the determining that the sensor signal fails to match the expected system profile data being based at least in part on an aging profile data driving a change in the operation of the at least one component over time.

In Example 10, the subject matter of any one or more of Examples 1-9 optionally include the determining that the sensor signal fails to match the expected system profile data comprising: determining that the sensor signal indicates a first plurality of power peaks over a first instance of a time period; and comparing the first plurality of power peaks to a second plurality of power peaks over the time period indicated by the expected system profile data.

In Example 11, the subject matter of Example 10 optionally includes the comparing comprising comparing a magnitude of a first power peak of the first plurality of power peaks to a magnitude of a first power peak of the second plurality of power peaks.

In Example 12, the subject matter of any one or more of Examples 10-11 optionally include the comparing comprising comparing a time of a first power peak of the first plurality of power peaks within the time period to a time of a first power peak of the second plurality of power peaks within the time period.

In Example 13, the subject matter of any one or more of Examples 1-12 optionally include the determining that the sensor signal fails to match the expected system profile data comprising comparing a frequency spectrum of the sensor signal to a frequency spectrum of the expected system profile data.

In Example 14, the subject matter of any one or more of Examples 1-13 optionally include the operations further comprising receiving an enablement message, the enablement message indicating that the power supply is to be enabled to compare the sensor signal to the expected system profile data.

Example 15 is a method of operating a power supply, the power supply comprising at least one processor, the method comprising: accessing, by the at least one processor, a sensor signal generated by a sensor of the power supply, the sensor signal describing an output electrical signal of the power supply; determining, by the at least one processor, that the sensor signal fails to match expected system profile data describing an operation of at least one component electrically coupled to the power supply; and responsive to determining that the sensor signal fails to match the expected system profile data, executing, by the at least one processor, a remedial action.

In Example 16, the subject matter of Example 15 optionally includes the remedial action comprising sending an alert message to a process control system, the alert message describing a deviation of the sensor signal from the expected system profile data.

In Example 17, the subject matter of any one or more of Examples 15-16 optionally include the remedial action comprising initiating a shutdown of the at least one component electrically coupled to the power supply.

In Example 18, the subject matter of any one or more of Examples 15-17 optionally include executing, by the at least one processor, a trained computerized model; and accessing, by the at least one processor, an output of the trained computerized model, the output of the trained computerized model being generated from at least one input that is based at least in part on the sensor signal, the output of the trained computerized model indicating that the sensor signal fails to match the expected system profile data.

In Example 19, the subject matter of any one or more of Examples 15-18 optionally include the determining that the sensor signal fails to match the expected system profile data comprising determining that the sensor signal indicates at least one monitored activity at a first component of the at least one component.

Example 20 is a non-transitory machine-readable medium comprising instructions that, when executed by at least one processor of a power supply, cause the at least one processor of the power supply to perform operations comprising: accessing a sensor signal generated by a sensor of the power supply, the sensor signal describing an output electrical signal of the power supply; determining that the sensor signal fails to match expected system profile data describing an operation of at least one component electrically coupled to the power supply; and responsive to determining that the sensor signal fails to match the expected system profile data, executing a remedial action.

The above detailed description includes references to the accompanying drawings, which form a part of the detailed description. The drawings show, by way of illustration, specific embodiments in which the disclosed examples can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The term "circuit" can include a dedicated hardware circuit, a general-purpose microprocessor, digital signal processor, or other processor circuit, and may be structurally configured from a general purpose circuit to a specialized circuit such as using firmware or software.

Any one or more of the techniques (e.g., methodologies) discussed herein may be performed on a machine. In various embodiments, the machine may operate as a standalone device or may be connected (e.g., networked) to other machines. In a networked deployment, the machine may operate in the capacity of a server machine, a client machine, or both in server-client network environments. In an example, the machine may act as a peer machine in peer-to-peer (P2P) (or other distributed) network environment. The machine may be a PC, a tablet PC, a STB, a PDA, a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions can enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Particular implementations of the systems and methods described herein may involve use of a machine (e.g., computer system) that may include a hardware processor (e.g., a CPU, a GPU, a hardware processor core, or any combination thereof), a main memory and a static memory, some or all of which may communicate with each other via an interlink (e.g., bus). The machine may further include a display unit, an alphanumeric input device (e.g., a keyboard), and a UI navigation device (e.g., a mouse). In an example, the display unit, input device and UI navigation device may be a touch screen display. The machine may additionally include a storage device (e.g., drive unit), a signal generation device (e.g., a speaker), a network interface device, and one or more sensors, such as a GPS sensor, compass, accelerometer, or other sensor. The machine may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device may include a machine readable medium on which is stored one or more sets of data structures or instructions (e.g., software) embodying or utilized by any one or more of the techniques or functions described herein. The instructions may also reside, completely or at least partially, within the main memory, within static memory, or within the hardware processor during execution thereof by the machine. In an example, one or any combination of the hardware processor, the main memory, the static memory, or the storage device may constitute machine readable media.

While the machine readable medium can include a single medium, the term "machine readable medium" may include a single medium or multiple media (e.g., a centralized or distributed database, and/or associated caches and servers) configured to store the one or more instructions.

The term "machine readable medium" may include any medium that is capable of storing, encoding, or carrying instructions for execution by the machine and that cause the machine to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., EPROM, EEPROM) and flash memory devices; magnetic disks, such as internal hard disks and removable disks; magneto-optical disks; and CD-ROM and DVD-ROM disks.

The instructions may further be transmitted or received over a communications network using a transmission medium via the network interface device utilizing any one of a number of transfer protocols (e.g., frame relay, internet protocol (IP), transmission control protocol (TCP), user datagram protocol (UDP), (HTTP, etc.). Example communication networks may include a LAN, a WAN, a packet data network (e.g., the Internet), mobile telephone networks (e.g., cellular networks), POTS networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, P2P networks, among others. In an example, the network interface device may include one or more physical jacks (e.g., Ethernet, coaxial, or phone jacks) or one or more antennas to connect to the communications network. In an example, the network interface device may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine, and includes digital or analog communications signals or other intangible medium to facilitate communication of such software.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, RAMs, ROMs, and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

The invention claimed is:

1. A power supply comprising:
a regulator circuit configured to generate an output electrical signal;
a sensor configured to generate a sensor signal describing the output electrical signal; and
at least one processor, the at least one processor programmed to perform operations comprising:
determining that the sensor signal fails to match expected system profile data describing an operation of at least one component electrically coupled to the power supply, the determining that the sensor signal fails to match the expected system profile data comprising:
executing a trained computerized model; and
accessing an output of the trained computerized model, the output of the trained computerized model being generated from at least one input that is based at least in part on the sensor signal, the output of the trained computerized model indicating that the sensor signal fails to match the expected system profile data; and
responsive to determining that the sensor signal fails to match the expected system profile data, executing a remedial action, the remedial action comprising initiating a shutdown of the at least one component electrically coupled to the power supply.

2. The power supply of claim 1, further comprising an enclosure, the regulator circuit, the sensor, and the at least one processor being positioned within the enclosure.

3. The power supply of claim 1, the remedial action further comprising sending an alert message to a process control system, the alert message describing a deviation of the sensor signal from the expected system profile data.

4. The power supply of claim 1, the operations further comprising:
accessing training data generated using the sensor; and
periodically retraining the trained computerized model using the training data.

5. The power supply of claim 1, the determining that the sensor signal fails to match the expected system profile data comprising determining that the sensor signal indicates at least one monitored activity at a first component of the at least one component.

6. The power supply of claim 1, the determining that the sensor signal fails to match the expected system profile data comprising determining that the sensor signal fails to match modified system profile data describing an operation of the at least one component according to a first known modification.

7. The power supply of claim 1, the determining that the sensor signal fails to match the expected system profile data being based at least in part on an aging profile data driving a change in the operation of the at least one component over time.

8. The power supply of claim 1, the determining that the sensor signal fails to match the expected system profile data comprising:
determining that the sensor signal indicates a first plurality of power peaks over a first instance of a time period; and
comparing the first plurality of power peaks to a second plurality of power peaks over the time period indicated by the expected system profile data.

9. The power supply of claim 8, the comparing comprising comparing a magnitude of a first power peak of the first plurality of power peaks to a magnitude of a first power peak of the second plurality of power peaks.

10. The power supply of claim 8, the comparing comprising comparing a time of a first power peak of the first plurality of power peaks within the time period to a time of a first power peak of the second plurality of power peaks within the time period.

11. The power supply of claim 1, the determining that the sensor signal fails to match the expected system profile data comprising comparing a frequency spectrum of the sensor signal to a frequency spectrum of the expected system profile data.

12. The power supply of claim 1, the operations further comprising receiving an enablement message, the enablement message indicating that the power supply is to be enabled to compare the sensor signal to the expected system profile data.

13. A method of operating a power supply, the power supply comprising at least one processor, the method comprising:
accessing, by the at least one processor, a sensor signal generated by a sensor of the power supply, the sensor signal describing an output electrical signal of the power supply;
determining, by the at least one processor, that the sensor signal fails to match expected system profile data describing an operation of at least one component electrically coupled to the power supply, the determining that the sensor signal fails to match the expected system profile data comprising:
executing a trained computerized model; and
accessing an output of the trained computerized model, the output of the trained computerized model being generated from at least one input that is based at least in part on the sensor signal, the output of the trained computerized model indicating that the sensor signal fails to match the expected system profile data; and
responsive to determining that the sensor signal fails to match the expected system profile data, executing, by the at least one processor, a remedial action, the remedial action comprising initiating a shutdown of the at least one component electrically coupled to the power supply.

14. The method of claim 13, the remedial action further comprising sending an alert message to a process control system, the alert message describing a deviation of the sensor signal from the expected system profile data.

15. The method of claim 13, the determining that the sensor signal fails to match the expected system profile data comprising determining that the sensor signal indicates at least one monitored activity at a first component of the at least one component.

16. A non-transitory machine-readable medium comprising instructions that, when executed by at least one processor of a power supply, cause the at least one processor of the power supply to perform operations comprising:
accessing a sensor signal generated by a sensor of the power supply, the sensor signal describing an output electrical signal of the power supply;
determining that the sensor signal fails to match expected system profile data describing an operation of at least one component electrically coupled to the power supply, the determining that the sensor signal fails to match the expected system profile data comprising:
executing a trained computerized model; and
accessing an output of the trained computerized model, the output of the trained computerized model being generated from at least one input that is based at least in part on the sensor signal, the output of the trained computerized model indicating that the sensor signal fails to match the expected system profile data; and
responsive to determining that the sensor signal fails to match the expected system profile data, executing a remedial action, the remedial action comprising initiating a shutdown of the at least one component electrically coupled to the power supply.

17. The non-transitory machine-readable medium of claim 16, the operations further comprising receiving an enablement message, the enablement message indicating that the power supply is to be enabled to compare the sensor signal to the expected system profile data.

18. The non-transitory machine-readable medium of claim 16, the remedial action further comprising sending an alert message to a process control system, the alert message describing a deviation of the sensor signal from the expected system profile data.

19. The non-transitory machine-readable medium of claim 16, the operations further comprising:
accessing training data generated using the sensor; and
periodically retraining the trained computerized model using the training data.

20. The non-transitory machine-readable medium of claim 16, the operations further comprising receiving an enablement message, the enablement message indicating that the power supply is to be enabled to compare the sensor signal to the expected system profile data.

* * * * *